(12) United States Patent
Kumari et al.

(10) Patent No.: US 12,095,538 B2
(45) Date of Patent: Sep. 17, 2024

(54) JOINT COMMUNICATION-RANGING CHANNEL ESTIMATION IN SIDELINK

(71) Applicant: QUALCOMM Incorporated, San Diego, CA (US)

(72) Inventors: Preeti Kumari, San Diego, CA (US); Kapil Gulati, Belle Mead, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 408 days.

(21) Appl. No.: 17/479,845

(22) Filed: Sep. 20, 2021

(65) Prior Publication Data

US 2023/0100617 A1     Mar. 30, 2023

(51) Int. Cl.
*H04B 7/06* (2006.01)
*G01S 13/931* (2020.01)

(52) U.S. Cl.
CPC .......... *H04B 7/0695* (2013.01); *G01S 13/931* (2013.01)

(58) Field of Classification Search
CPC ............................ H04B 7/0695; G01S 13/931
See application file for complete search history.

(56) References Cited

U.S. PATENT DOCUMENTS

| | | | |
|---|---|---|---|
| 11,057,497 B2 * | 7/2021 | Shimizu | H04W 4/80 |
| 2018/0234153 A1 * | 8/2018 | Lincoln | H04W 52/0274 |
| 2020/0010095 A1 * | 1/2020 | Kim | B60W 30/02 |

* cited by examiner

*Primary Examiner* — Peter M Bythrow
*Assistant Examiner* — Nazra Nur Waheed
(74) *Attorney, Agent, or Firm* — Loza & Loza, LLP

(57) ABSTRACT

Aspects relate to techniques for joint communication-ranging (JCR) channel estimation. A first wireless communication device may transmit a sidelink message to a second wireless communication device and receive bistatic communication channel feedback from the second wireless communication device based on the sidelink message. The first wireless communication device may further transmit a ranging signal, such as a radar signal or lidar signal, and obtain a monostatic ranging channel estimate based on the received reflected ranging signals. The first wireless communication device may then associate and correlate the monostatic ranging channel estimate with the bistatic communication channel feedback to obtain joint communication-ranging (JCR) side information. The first wireless communication device may then transmit a sidelink transmission to the second wireless communication device using a transmit power and/or a beamforming parameter selected based on the JCR side information.

24 Claims, 12 Drawing Sheets

JOINT COMMUNICATION-RANGING CHANNEL ESTIMATION IN SIDELINK

TECHNICAL FIELD

The technology discussed below relates generally to wireless communication networks, and more particularly, to techniques for joint communication and ranging sensing in sidelink.

BACKGROUND

Wireless communication between devices may be facilitated by various network configurations. In one configuration, a cellular network may enable user equipment (UEs) to communicate with one another through signaling with a nearby base station or cell. Another wireless communication network configuration is a device to device (D2D) network in which UEs may signal one another directly, rather than via an intermediary base station or cell. For example, D2D communication networks may utilize sidelink signaling to facilitate the direct communication between UEs over a proximity service (ProSe) PC5 interface. In some sidelink network configurations, UEs may further communicate in a cellular network, generally under the control of a base station. Thus, the UEs may be configured for uplink and downlink signaling via a base station and further for sidelink signaling directly between the UEs without transmissions passing through the base station.

One example of a sidelink wireless communication network is a vehicle-to-everything (V2X) communication network. V2X communication involves the exchange of information not only between vehicles themselves, but also between vehicles and external systems, such as streetlights, buildings, pedestrians, and cellular communication networks. V2X devices, such as vehicular V2X devices, may further be equipped with an automotive radar or lidar system to sense the environment and enable safety and comfort features, such as collision avoidance and adaptive cruise control.

For example, a radar system may include a radar transceiver configured to transmit a radar signal periodically at a high rate to sense the environment. The radar signal may be reflected by surrounding objects, referred to as scatterers or scattering clusters, and the resulting radar echoes may be received by the radar transceiver. The received radar echoes may then be processed to estimate the channel parameters of respective two-way monostatic channels between the wireless communication device and each of the other surrounding objects. Here, the term monostatic refers to a channel in which a transmitter and receiver are at the same location. The monostatic channel parameters that may be estimated using the radar echoes may include, for example, the Doppler shift profile, delay profile, and angular profile.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a first wireless communication device configured for wireless communication is disclosed. The first wireless communication device includes a transceiver, a ranging device, a memory, and a processor coupled to the transceiver, the ranging device, and the memory. The processor and the memory are configured to transmit a sidelink message to a second wireless communication device via a bistatic communication channel between the first wireless communication device and the second wireless communication device via the transceiver, receive bistatic communication channel feedback from the second wireless communication device based on the sidelink message via the transceiver, transmit a ranging signal via the ranging device, receive reflected ranging signals based on the ranging signal via the ranging device to obtain a monostatic ranging channel estimate, and transmit a sidelink transmission to the second wireless communication device via the transceiver using at least one of a transmit power or a beamforming parameter selected based on joint communication-ranging side information. The joint communication-ranging side information is based on the bistatic communication channel feedback and the monostatic ranging channel estimate.

Another example provides a method for wireless communication at a first wireless communication device configured for wireless communication. The method includes transmitting a sidelink message to a second wireless communication device via a bistatic communication channel between the first wireless communication device and the second wireless communication device, receiving bistatic communication channel feedback from the second wireless communication device based on the sidelink message, transmitting a ranging signal, receiving reflected ranging signals based on the ranging signal to obtain a monostatic ranging channel estimate, and transmitting a sidelink transmission to the second wireless communication device using at least one of a transmit power or a beamforming parameter selected based on joint communication-ranging side information. The joint communication-ranging side information is based on the bistatic communication channel feedback and the monostatic ranging channel estimate.

Another example provides a first wireless communication device configured for wireless communication. The first wireless communication device includes means for transmitting a sidelink message to a second wireless communication device via a bistatic communication channel between the first wireless communication device and the second wireless communication device, means for receiving bistatic communication channel feedback from the second wireless communication device based on the sidelink message, means for transmitting a ranging signal, receiving reflected ranging signals based on the ranging signal to obtain a monostatic ranging channel estimate, and means for transmitting a sidelink transmission to the second wireless communication device using at least one of a transmit power or a beamforming parameter selected based on joint communication-ranging side information. The joint communication-ranging side information is based on the bistatic communication channel feedback and the monostatic ranging channel estimate.

Another example provides a non-transitory computer-readable medium having stored therein instructions executable by one or more processors of a first wireless communication device to transmit a sidelink message to a second wireless communication device via a bistatic communication channel between the first wireless communication device and the second wireless communication device, receive bistatic communication channel feedback from the second wireless communication device based on the sidelink message, transmit a ranging signal, receive reflected ranging signals based on the ranging signal to obtain a monostatic ranging channel estimate, and transmit a sidelink transmission to the second wireless communication device using at least one of a transmit power or a beamforming parameter selected based on joint communication-ranging side information. The joint communication-ranging side information is based on the bistatic communication channel feedback and the monostatic ranging channel estimate.

These and other aspects will become more fully understood upon a review of the detailed description, which follows. Other aspects, features, and examples will become apparent to those of ordinary skill in the art, upon reviewing the following description of specific, exemplary examples of in conjunction with the accompanying figures. While features may be discussed relative to certain examples and figures below, all examples can include one or more of the advantageous features discussed herein. In other words, while one or more examples may be discussed as having certain advantageous features, one or more of such features may also be used in accordance with the various examples discussed herein. In similar fashion, while exemplary examples may be discussed below as device, system, or method examples such exemplary examples can be implemented in various devices, systems, and methods.

DETAILED DESCRIPTION

Figure 1:
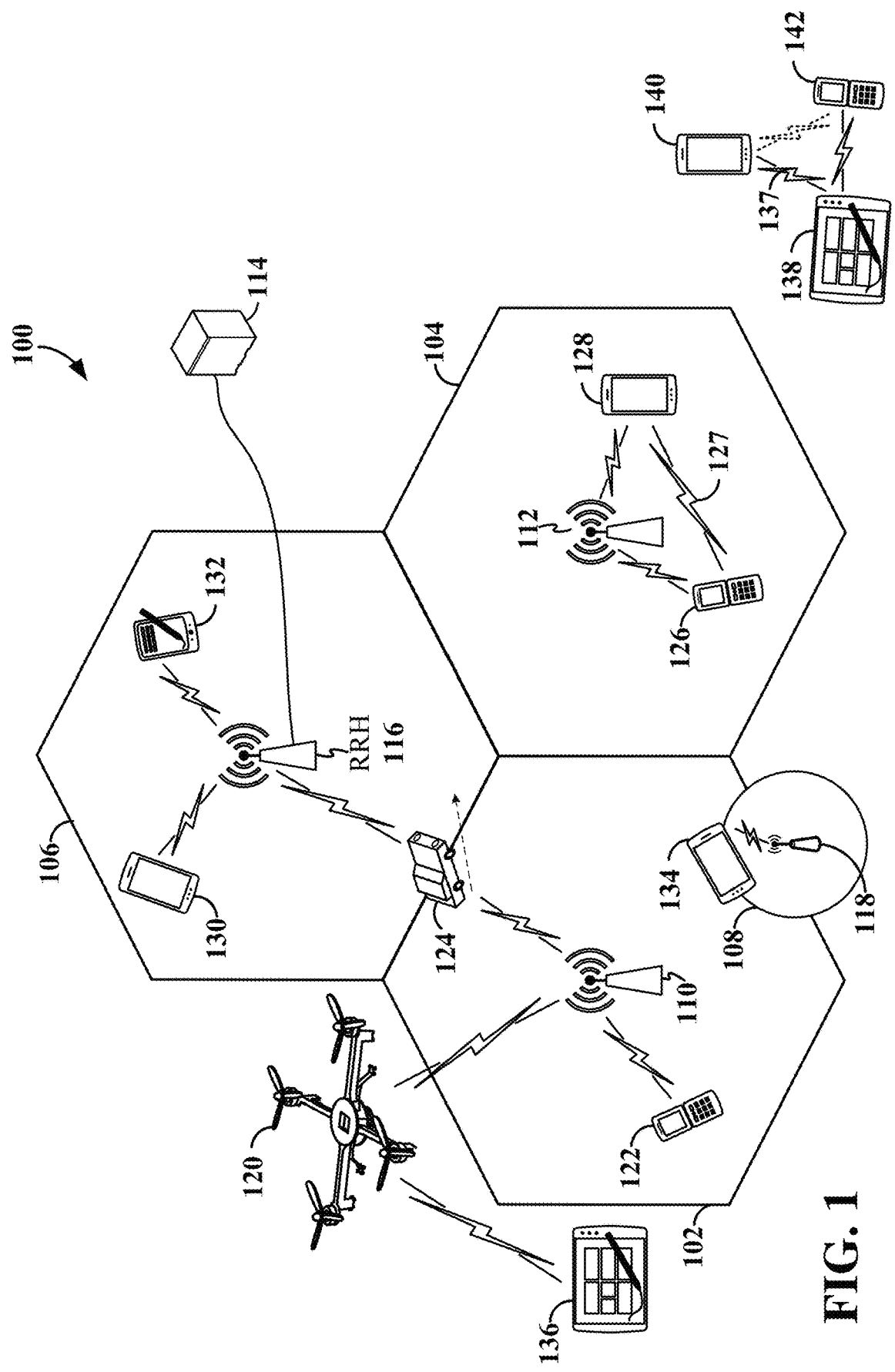
FIG. 1 is a diagram illustrating an example of a wireless radio access network according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Various aspects relate to joint communication-ranging (JCR) channel estimation. A first wireless communication device (e.g., a UE/V2X device) may transmit a sidelink message to a second wireless communication device (e.g., UE/V2X device) and receive bistatic communication channel feedback from the second wireless communication device based on the sidelink message. In some examples, the bistatic communication channel feedback may include a set of autocorrelation samples or a power spectral density corresponding to the bistatic communication channel Doppler profile (e.g., Doppler shift profile). For example, the set of autocorrelation samples may include an initial set of autocorrelation samples (e.g., the first few autocorrelation samples) of a plurality of autocorrelation samples.

The first wireless communication device may further transmit a ranging signal (e.g., a radar signal or lidar signal) and receive reflected ranging signals (e.g., radar echoes or reflected light) reflected from the second wireless communication device. In some examples, the reflected ranging signals may further be reflected from other surrounding objects (scatterers or scattering clusters). Based on the reflected ranging signals, the first wireless communication device may obtain a monostatic ranging channel estimate. The first wireless communication device may then associate and correlate the monostatic ranging channel estimate with the bistatic communication channel feedback to obtain joint communication-ranging (JCR) side information. For example, the first wireless communication device may obtain a communication channel Doppler profile based on the bistatic communication channel feedback and estimate a ranging channel Doppler and angular profile based on the reflected ranging signals. The first wireless communication device may then associate and correlate the communication channel Doppler profile with the ranging channel Doppler and angular profile to obtain the JCR side information.

Based on the JCR side information, the first wireless communication device may optimize and update the transmit power and beamforming parameters of sidelink communications to improve the communication rate and provide robustness. In addition, the first wireless communication device may utilize the JCR side information for improved ranging channel estimation and enhanced sidelink communication synchronization (e.g., frequency offset).

For example, the first wireless communication device may transmit a sidelink transmission to the second wireless communication device using a transmit power and/or a beamforming parameter selected based on the JCR side information. In one example, the JCR side information may indicate that there is a line-of-sight (LOS) link between the first and second wireless communication devices. In this example, the first wireless communication device may select a narrow transmit beam for transmitting the sidelink transmission. In another example, the JCR side information may indicate that there is a non-LOS link between the first and second wireless communication devices. In this example, the first wireless communication device may select a transmit beam having a beam direction towards a target (object) for reflection of the sidelink transmission. For example, a target with low Doppler shift and high Doppler spread may be selected to bounce-off the sidelink transmission from the first wireless communication device to the second wireless communication device. In addition, the first wireless communication device may further select a beamforming shape (e.g., narrow or wide beam width) of the transmit beam for the non-LOS link to increase the data rate and decrease the transmit power of the sidelink transmission.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, disaggregated arrangements (e.g., disaggregated base station or UE), end-user devices, etc. of varying sizes, shapes and constitution.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided. The RAN 100 may implement any suitable wireless communication technology or technologies to provide radio access. As one example, the RAN 100 may operate according to 3rd Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates cells 102, 104, 106, and cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 100 operates according to both the LTE and 5G NR standards, one of the base stations may be an LTE base station, while another base station may be a 5G NR base station.

Various base station arrangements can be utilized. For example, in FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the cell 108 which may overlap with one or more macrocells. In this example, the cell 108 may be referred to as a small cell (e.g., a microcell, picocell, femtocell, home base station, home Node B, home eNode B, etc.), as the base station 118 supports a cell having a relatively small size. Cell sizing can be done according to system design as well as component constraints.

It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes an unmanned aerial vehicle (UAV) 120, which may be a drone or quadcopter. The UAV 120 may be configured to function as a base station, or more specifically as a mobile base station. That is, in some examples, a cell may not necessarily be stationary, and the geographic area of the cell may move according to the location of a mobile base station such as the UAV 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station 120. Here, each base station 110, 112, 114, 118, and 120 may be configured to provide an access point to a core network (not shown) for all the UEs in the respective cells. In some examples, the UAV 120 (e.g., the quadcopter) can be a mobile network node and may be configured to function as a UE. For example, the UAV 120 may operate within cell 102 by communicating with base station 110.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or traffic information (e.g., user data traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). For example, two or more UEs (e.g., UEs 138, 140, and 142) may communicate with each other using sidelink signals 137 without relaying that communication through a base station. In some examples, the UEs 138, 140, and 142 may each function as a scheduling entity or transmitting sidelink device and/or a scheduled entity or a receiving sidelink device to schedule resources and communicate sidelink signals 137 therebetween without relying on scheduling or control information from a base station. In other examples, two or more UEs (e.g., UEs 126 and 128) within the coverage area of a base station (e.g., base station 112) may also communicate sidelink signals 127 over a direct link (sidelink) without conveying that communication through the base station 112. In this example, the base station 112 may allocate resources to the UEs 126 and 128 for the sidelink communication. In either case, such sidelink signaling 127 and 137 may be implemented in a peer-to-peer (P2P) network, a device-to-device (D2D) network, a vehicle-to-vehicle (V2V) network, a vehicle-to-everything (V2X) network, a mesh network, or other suitable direct link network.

In some examples, a D2D relay framework may be included within a cellular network to facilitate relaying of communication to/from the base station 112 via D2D links (e.g., sidelinks 127 or 137). For example, one or more UEs (e.g., UE 128) within the coverage area of the base station 112 may operate as relaying UEs to extend the coverage of the base station 112, improve the transmission reliability to one or more UEs (e.g., UE 126), and/or to allow the base station to recover from a failed UE link due to, for example, blockage or fading.

Two primary technologies that may be used by V2X networks include dedicated short range communication (DSRC) based on IEEE 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to sidelink networks other than V2X networks.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 100, the ability for a UE to communicate while moving, independent of their location, is referred to as mobility. The various physical channels between the UE and the RAN are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In some examples, a RAN 100 may enable mobility and handovers (i.e., the transfer of a UE's connection from one radio channel to another). For example, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The electromagnetic spectrum is often subdivided, based on frequency/wavelength, into various classes, bands, channels, etc. In 5G NR two initial operating bands have been identified as frequency range designations FR1 (410 MHZ-7.125 GHz) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHZ-71 GHZ), FR4 (52.6 GHz-114.25 GHZ), and FR5 (114.25 GHZ-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 2. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 2:
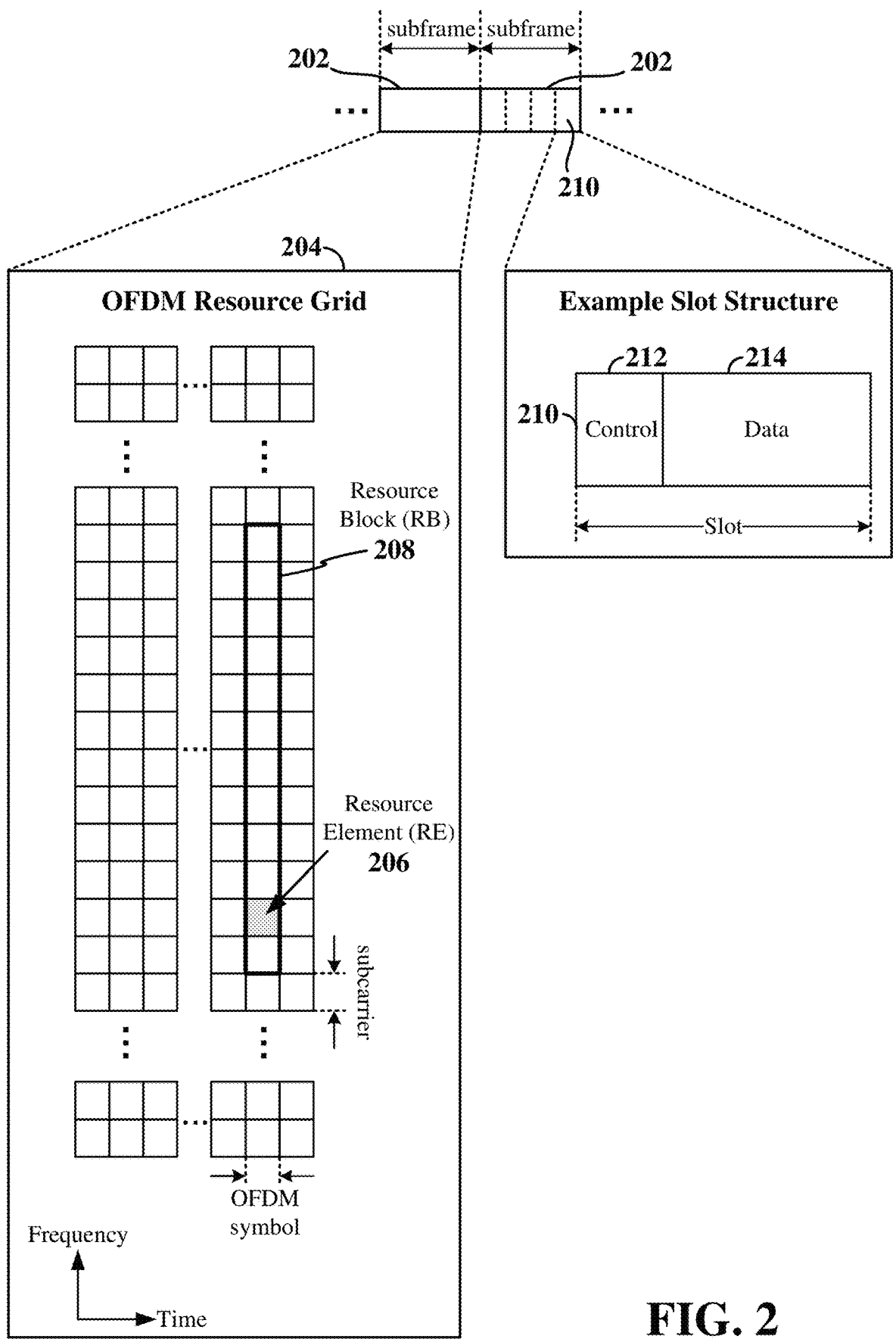
FIG. 2 is a diagram illustrating an example of a frame structure for use in a wireless communication network according to some aspects.

Referring now to FIG. 2, an expanded view of an exemplary subframe 202 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 204 may be used to schematically represent time-frequency resources for a given antenna port. That is, in a multiple-input-multiple-output (MIMO) implementation with multiple antenna ports available, a corresponding multiple number of resource grids 204 may be available for communication. The resource grid 204 is divided into multiple resource elements (REs) 206. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 208, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 208 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of UEs or sidelink devices (hereinafter collectively referred to as UEs) for downlink, uplink, or sidelink transmissions typically involves scheduling one or more resource elements 206 within one or more sub-bands or bandwidth parts (BWPs). Thus, a UE generally utilizes only a subset of the resource grid 204. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

In this illustration, the RB 208 is shown as occupying less than the entire bandwidth of the subframe 202, with some subcarriers illustrated above and below the RB 208. In a given implementation, the subframe 202 may have a bandwidth corresponding to any number of one or more RBs 208. Further, in this illustration, the RB 208 is shown as occupying less than the entire duration of the subframe 202, although this is merely one possible example.

Each 1 ms subframe 202 may consist of one or multiple adjacent slots. In the example shown in FIG. 2, one subframe 202 includes four slots 210, as an illustrative example.

In some examples, a slot may be defined according to a specified number of OFDM symbols with a given cyclic prefix (CP) length. For example, a slot may include 7 or 12 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 210 illustrates the slot 210 including a control region 212 and a data region 214. In general, the control region 212 may carry control channels, and the data region 214 may carry data channels. Of course, a slot may contain all DL, all UL, or at least one DL portion and at least one UL portion. The structure illustrated in FIG. 2 is merely exemplary in nature, and different slot structures may be utilized, and may include one or more of each of the control region(s) and data region(s).

Although not illustrated in FIG. 2, the various REs 206 within a RB 208 may be scheduled to carry one or more physical channels, including control channels, shared channels, data channels, etc. Other REs 206 within the RB 208 may also carry pilots or reference signals. These pilots or reference signals may provide for a receiving device to perform channel estimation of the corresponding channel, which may enable coherent demodulation/detection of the control and/or data channels within the RB 208.

In some examples, the slot 210 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 206 (e.g., within the control region 212) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 206 (e.g., in the control region 212 or the data region 214) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information.

In an UL transmission, the scheduled entity (e.g., UE) may utilize one or more REs 206 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 206 (e.g., within the data region 214) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 206 within the data region 214 may be configured to carry other signals, such as one or more SIBs and DMRSs.

In an example of sidelink communication over a sidelink carrier via a PC5 interface, the control region 212 of the slot 210 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 214 of the slot 210 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 206 within slot 210. For example, HARQ feedback information may be transmitted in a physical sidelink feedback channel (PSFCH) within the slot 210 from the receiving sidelink device to the transmitting sidelink device. In addition, one or more reference signals, such as a sidelink SSB, a sidelink CSI-RS, a sidelink SRS, a sidelink DRMS, and/or a sidelink positioning reference signal (PRS) may be transmitted within the slot 210.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 2 are not necessarily all of the channels or carriers that may be utilized between devices, and those of ordinary skill in the art will recognize that other channels or carriers may be utilized in addition to those illustrated, such as other traffic, control, and feedback channels.

Figure 3:
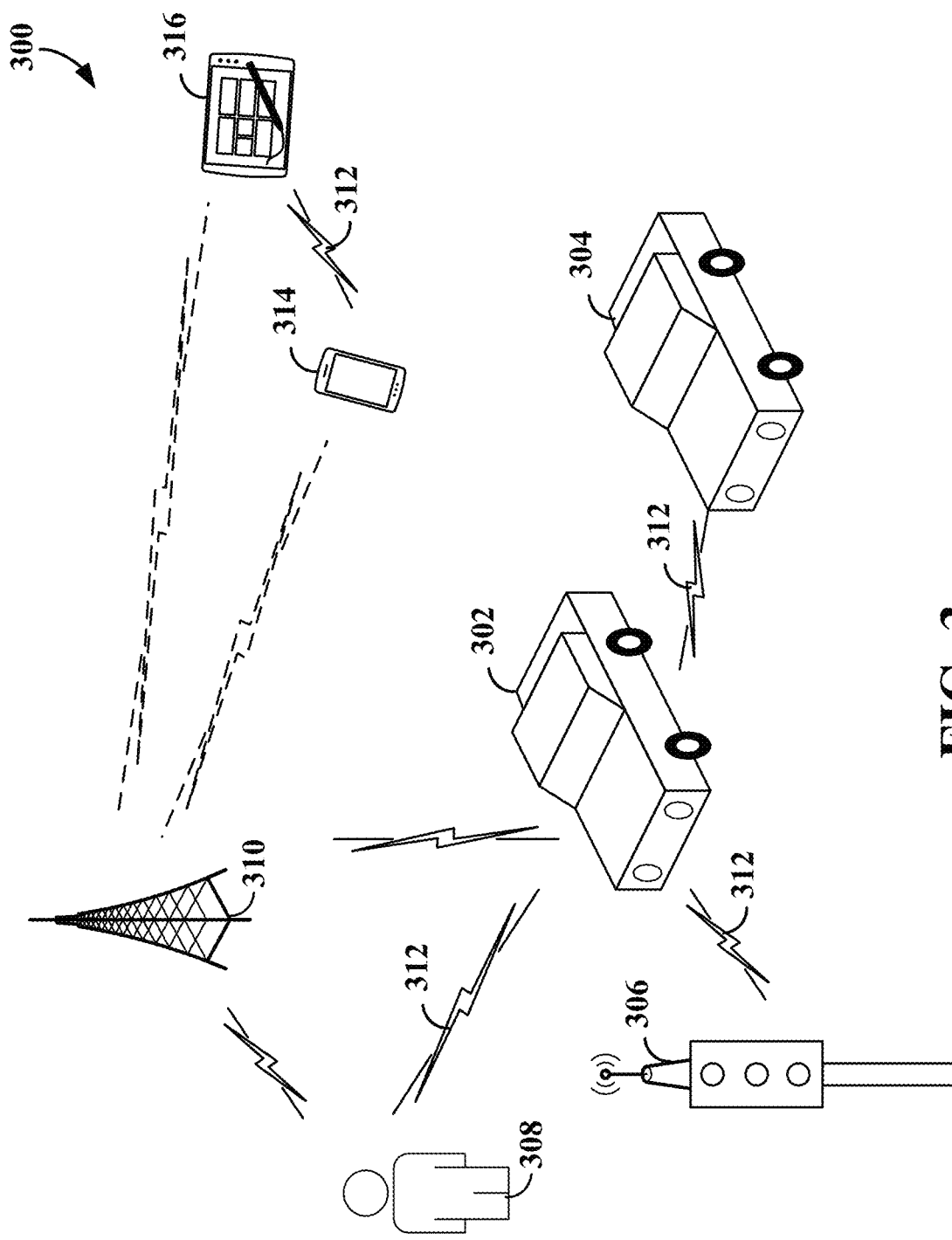
FIG. 3 is a diagram illustrating an example of a wireless communication network employing sidelink communication according to some aspects.

FIG. 3 illustrates an example of a wireless communication network 300 configured to support D2D or sidelink communication. In some examples, sidelink communication may include V2X communication. V2X communication involves the wireless exchange of information directly between not only vehicles (e.g., vehicles 302 and 304) themselves, but also directly between vehicles 302/304 and infrastructure (e.g., roadside units (RSUs) 306), such as streetlights, buildings, traffic cameras, tollbooths or other stationary objects, vehicles 302/304 and pedestrians 308 (e.g., vulnerable road users (VRUs)), and vehicles 302/304 and wireless communication networks (e.g., base station 310). VRUs may include not only pedestrians, but also bicycle riders, road construction crew, etc. V2X devices at VRUs may include, for example, cell phones, vehicle/bike mounted hardware, smart watches, construction equipment, etc. In some examples, V2X communication may be implemented in accordance with the New Radio (NR) cellular V2X standard defined by 2GPP, Release 16, or other suitable standard.

V2X communication enables vehicles 302 and 304 to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such V2X data may enable autonomous driving and improve road safety and traffic efficiency. For example, the exchanged V2X data may be utilized by a V2X connected vehicle 302 and 304 to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device of a pedestrian/cyclist 308 may be utilized to trigger a warning sound, vibration, flashing light, etc., in case of imminent danger.

The sidelink communication between vehicle-UEs (V-UEs) 302 and 304 or between a V-UE 302 or 304 and either an RSU 306 or a pedestrian-UE (P-UE) 308 may occur over a sidelink (or sidelink channel) 312 utilizing a proximity service (ProSe) PC5 interface. In various aspects of the disclosure, the PC5 interface may further be utilized to support D2D sidelink communication in other proximity use cases (e.g., other than V2X). Examples of other proximity use cases may include smart wearables, public safety, or commercial (e.g., entertainment, education, office, medical, and/or interactive) based proximity services. In the example shown in FIG. 3, ProSe communication may further occur between UEs 314 and 316.

ProSe communication may support different operational scenarios, such as in-coverage, out-of-coverage, and partial coverage. Out-of-coverage refers to a scenario in which UEs (e.g., UEs 314 and 316) are outside of the coverage area of a base station (e.g., base station 310), but each are still configured for ProSe communication. Partial coverage refers to a scenario in which some of the UEs (e.g., V-UE 304) are outside of the coverage area of the base station 310, while other UEs (e.g., V-UE 302 and P-UE 308) are in communication with the base station 310. In-coverage refers to a scenario in which UEs (e.g., V-UE 302 and P-UE 308) are in communication with the base station 310 (e.g., gNB) via a Uu (e.g., cellular interface) connection to receive ProSe service authorization and provisioning information to support ProSe operations.

To facilitate D2D or V2X sidelink communication between, for example, V-UEs 302 and 304 over the sidelink 312, the V-UEs 302 and 304 may transmit discovery signals therebetween. In some examples, each discovery signal may include a synchronization signal, such as a primary synchronization signal (PSS) and/or a secondary synchronization signal (SSS) of a sidelink SSB that facilitates device discovery and enables synchronization of communication on the sidelink 312. For example, the discovery signal may be utilized by the V-UE 304 to measure the signal strength (e.g., signal-to-noise ratio (SNR)) and channel status of a potential sidelink (e.g., sidelink 312) with another UE (e.g., V-UE 302). The V-UE 304 may utilize the measurement results to select a UE (e.g., V-UE 302) for sidelink communication or relay communication.

In addition, the V-UE 304 may send V2X feedback messages to the V-UE 302. For example, the V2X feedback messages sent by V-UE 304 to V-UE 302 may include one or more of an identifier of V-UE 302 and/or the obtained measurement (e.g., SNR) of the two-way bistatic sidelink channel between V-UE 302 and V-UE 304. Here, the term bistatic refers to a channel in which a transmitter and receiver are at different locations. The V2X feedback messages may be used to enhance the data rate and communication efficiency of the sidelink channel between V-UE 302 and V-UE 304. However, the V2X feedback messages may be sent with a limited update rate.

Figure 4:
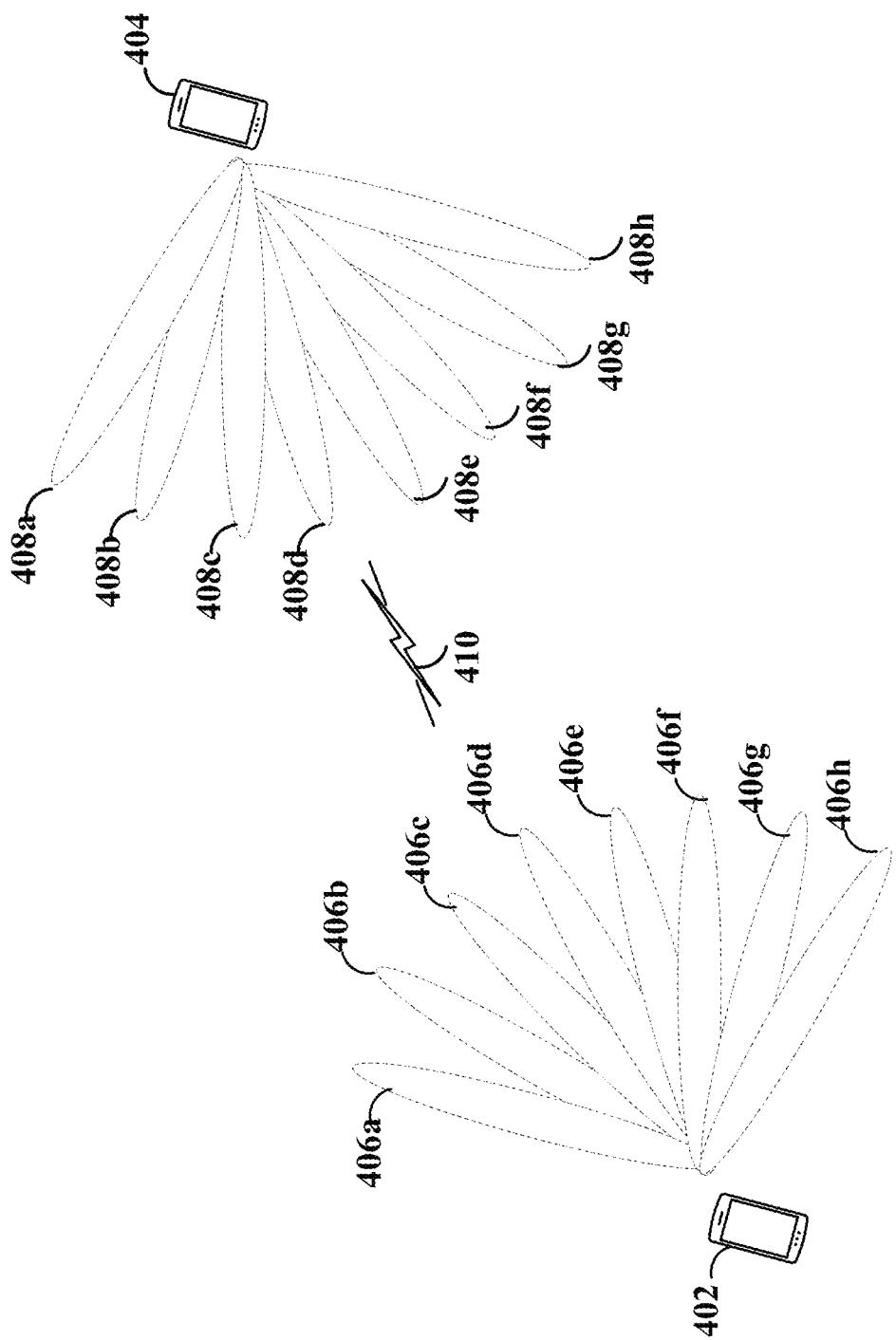
FIG. 4 is a diagram illustrating beamforming in a sidelink network according to some aspects.

FIG. 4 is a diagram illustrating communication between wireless communication devices 402 and 404 using beam-formed sidelink signals according to some aspects. Each of the wireless communication devices 402 and 404 may be any of the UEs or V2X devices illustrated in any of FIGS. 1 and/or 2.

In the example shown in FIG. 4, the wireless communication devices 402 and 404 may be configured to communicate sidelink signals 410 on one or more of a plurality of beams 406a-406h. Although the beams 406a-406h are illustrated in FIG. 4 as being generated on wireless communication device 402, it should be understood that the same concepts described herein apply to beams generated on wireless communication device 404. For example, each wireless communication device 402 and 404 may select one or more beams to transmit sidelink signals to the other wireless communication device. In some examples, due to channel reciprocity, the selected beam(s) on each wireless communication device 402 and 404 may be used for both transmission and reception of sidelink signals. It should be noted that while some beams are illustrated as adjacent to one another, such an arrangement may be different in different aspects. In some examples, the wireless communication devices 402 and 404 may generate more or less beams distributed in different directions.

The number of beams on which a particular wireless communication device 402 or 404 may simultaneously communicate may be defined based on NR SL standards and specifications and capabilities of the wireless communication devices 402 and 404. For example, the number of beams may be determined based on a number of antenna panels configured on the wireless communication device 402 or 404. As an example, a wireless communication device 402 or 404 may include one or two antenna panels, and as such, may be configured to communicate on one or two beams, respectively, at a time. Each beam may be utilized to transmit a respective layer for MIMO communication. Other numbers of simultaneous beams are also possible in the present disclosure.

In some examples, to select one or more beams for communication on a sidelink between the two wireless communication devices 402 and 404, a first wireless communication device (e.g., wireless communication device 402) may transmit a sidelink reference signal, such as a sidelink synchronization signal block (SSB) or sidelink channel state information (CSI) reference signal (RS), on each of the plurality of beams 406a-406h in a beam-sweeping manner towards a second wireless communication device (e.g., wireless communication device 404). The second wireless communication device 404 searches for and identifies the beams based on the beam reference signals. The wireless communication device 402 then performs beam measurements (e.g., reference signal received power (RSRP), signal-to-interference-plus-noise ratio (SINR), reference signal received quality (RSRQ), etc.) on the beam reference signals to determine the respective beam quality of each of the beams.

The second wireless communication device 404 may then transmit a beam measurement report to the first wireless communication device indicating the beam quality of one or more of the measured beams. The first wireless communication device or a radio access network (RAN) node (e.g., a base station, such as a gNB) may then select the particular beam(s) for communication between the first and second wireless communication devices on the sidelink based on the beam measurement report. For example, the first wireless communication device may forward the beam measurement report to the base station for selection of the beam(s). The base station may then signal the selected beam(s) via, for example, a radio resource control (RRC) message or via a medium access control (MAC) control element (CE).

Each selected beam (e.g., beam 406d) on one of the wireless communication devices (e.g., wireless communication device 402) may form a beam pair link (BPL) with a corresponding selected beam (e.g., beam 408d) on the other wireless communication device 404. Thus, each BPL includes corresponding transmit and receive beams on the wireless communication devices 402 and 404. For example, a BPL may include a first transmit/receive beam 406d on the first wireless communication device 402 and a second transmit/receive beam 408d on the second wireless communication device 404. To increase the data rate, multiple BPLs can be used to facilitate spatial multiplexing of multiple data streams. In some examples, the different BPLs can include beams from different antenna panels.

Figure 5:
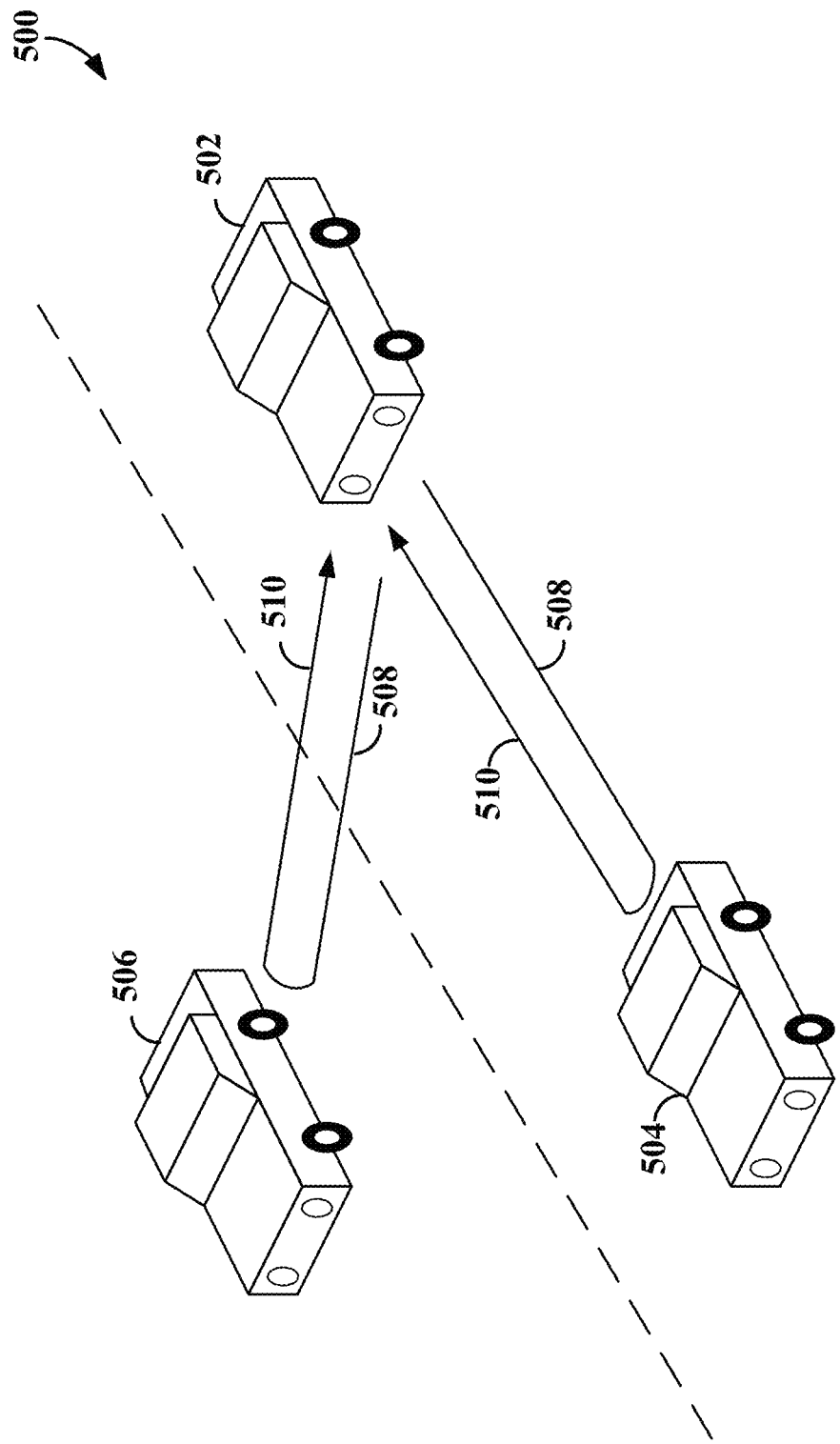
FIG. 5 is a diagram illustrating an example of V2X devices employing automotive radar according to some aspects.

Vehicular V2X devices, such as V-UEs 302 and 304 shown in FIG. 3, may further be equipped with a radio detection and ranging (radar) system. Although the description herein refers to radar systems, the present disclosure may be applicable to other sensing systems, such as light detection and ranging (lidar) systems. FIG. 5 illustrates an example of V2X devices 502, 504, and 506 employing automotive radar/lidar systems. However, it should be understood that radar/lidar systems may be employed on other wireless communication devices, such as base stations (e.g., eNBs, gNBs, TRPs, etc.) and UEs in cellular network configurations, and the present disclosure is not limited to any particular type of wireless communication device or network configuration.

In the example shown in FIG. 5, V-UE 502 is shown in proximity to V-UEs 504 and 506. V-UE 502 includes an automotive radar system including a radar transceiver (or a laser and corresponding optics for transmission and reception of lidar signals (e.g., light)). The automotive radar transceiver may be configured to transmit a radar signal 508 periodically at a high rate to sense the environment. The radar signal 508 may be reflected by surrounding objects (e.g., V-UEs 504 and 506), and the resulting radar echoes (e.g., reflected radar signals/lidar signals) 510 may be received by the radar transceiver in full-duplex configuration. The surrounding objects may be referred to herein as scatterers or scattering clusters.

The received radar echoes 510 may then be processed to estimate the channel parameters of respective two-way monostatic channels between V-UE 502 and each of the other surrounding objects (e.g., V-UEs 504 and 506). Here, the term monostatic refers to a channel in which a transmitter and receiver are at the same location (e.g., at V-UE 502). The channel parameters that may be estimated using the radar echoes may include, for example, the delay spread, Doppler shift profile and angular profile. Thus, the V-UE 502 may estimate the respective Doppler spread (e.g., Doppler shift profile) and angular spread (e.g., angular profile) of the respective two-way monostatic channel between V-UE 502 and V-UE 504 and between V-UE 502 and V-UE 506. The angular profile may include, for example, the azimuth and elevation corresponding to a received radar echo. In examples in which the automotive radar system utilizes large antenna arrays and long coherent processing time intervals, the accuracy of the angular and velocity estimations may be high. However, radar systems may suffer from poor data association and may have limited sensing capabilities due to small coverage, blockage, and clutter in the environment.

In some examples, V-UE 502 may further include a communication transceiver for sidelink communication over a two-way bistatic sidelink channel between V-UE 502 and V-UE 504. Thus, V-UE 502 may be configured to transmit sidelink (e.g., V2X) transmissions to V-UE 504. For high-data rate (e.g., a few Gbs) vehicular applications, V-UE 502 may further be configured to transmit the sidelink transmissions to V-UE 504 on a selected transmit beam (e.g., of an FR2 band, such as 73 GHZ) with a high bandwidth (e.g., 2 GHZ). However, due to vehicular mobility and blockage from surrounding objects, V-UE 502 may suffer a reduction in its communication capability (e.g., intermittent outage). For example, V-UE 506 may initiate a lane change maneuver, disrupting a line-of-sight link between V-UE 502 and V-UE 504. As another example, V-UE 502 may engage in a large acceleration that may impact the communication link with V-UE 504.

To enable robust and efficient communication resulting in high spectral efficiency with a low transmit power, V-UE 502 may perform additional beamforming training and communication channel sensing to select a new transmit/receive beam for communication with V-UE 504. However, this may add additional overhead and decrease the communication data rate. In addition, the radar field-of-view and estimation accuracy may be limited at V-UE 502 as a result of the vehicular mobility and/or blockage.

Therefore, various aspects of the disclosure relate to techniques for associating and correlating a monostatic ranging (e.g., radar or lidar) channel estimate obtained from reflected ranging signals (e.g., radar echoes 510 or reflected light) received from V-UE 504 with bistatic communication channel feedback received from the V-UE 504 to obtain joint communication-ranging (JCR) side information. The JCR side information includes information relevant to both the sidelink communication channel and the radar channel. In some examples, the bistatic communication channel feedback may include a set of autocorrelation samples or a power spectral density corresponding to the bistatic communication channel Doppler profile. In addition, the monostatic radar channel estimate may include a radar channel Doppler and angular profile. The V-UE 502 may associate and correlate the communication channel Doppler profile with the radar channel Doppler and angular profile to obtain the JCR side information.

The JCR side information may then be utilized by V-UE 502 to select a transmit power and/or a beamforming parameter for a subsequent sidelink V2X transmission from V-UE 502 to V-UE 504. Thus, the JCR side information may mitigate the need for additional training overhead at V-UE 502 to improve the communication rate and provide robustness. In addition, the JCR side information may be utilized by V-UE 502 to improve sidelink communication synchronization (e.g., frequency offset). Furthermore, the JCR side information may be utilized by V-UE 502 to improve ranging channel estimation. For example, the V-UE 502 may transmit additional ranging signals and update the monostatic radar channel estimate based on both additional reflected ranging signals received based on the additional ranging signals and the JCR side information.

Figure 6A:
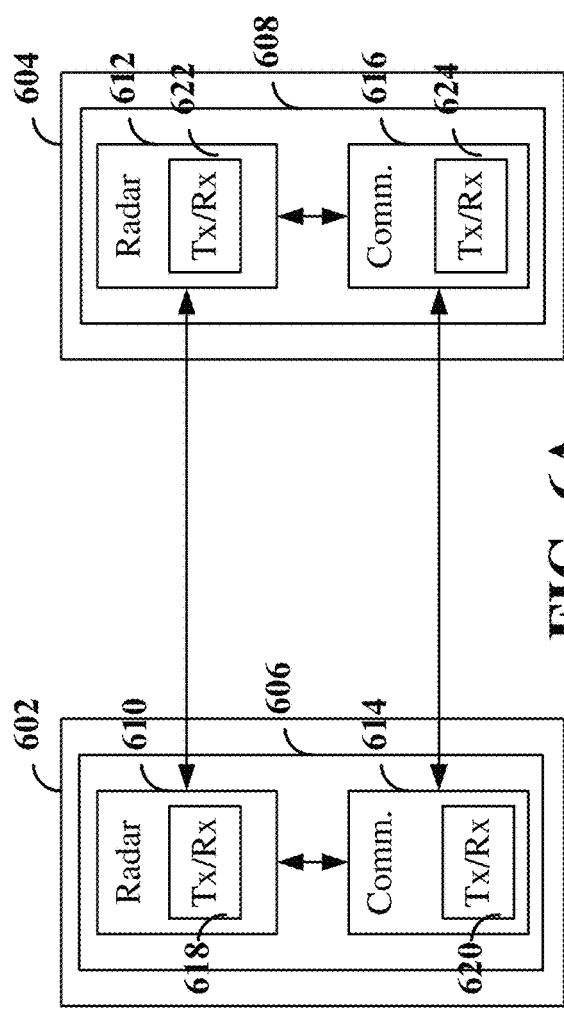
FIGS. 6A and 6B illustrate examples of joint communication-ranging (JCR) systems that may be implemented on wireless communication devices according to some aspects.
Figure 6B:
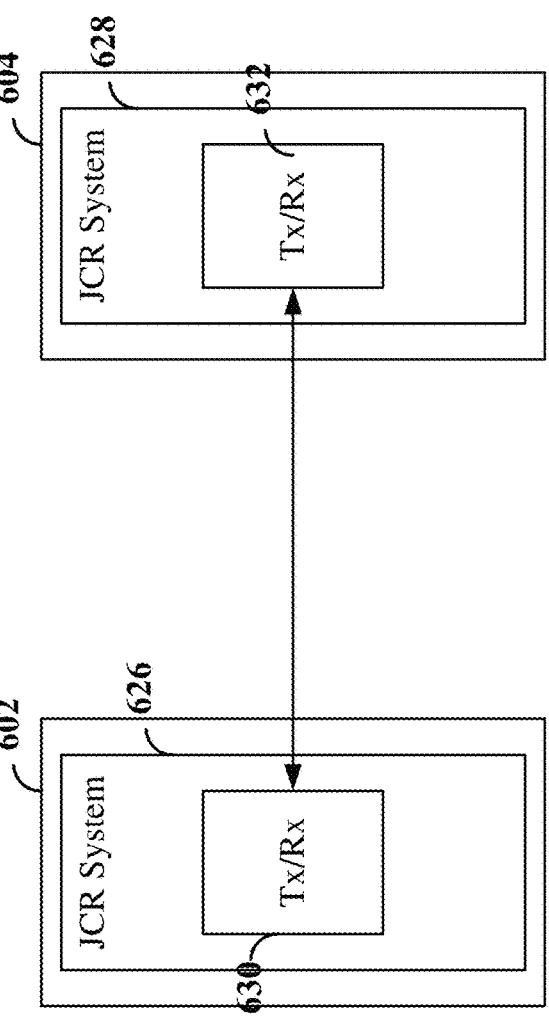

To facilitate JCR side information estimation, a wireless communication device may include a joint communication-ranging (JCR) system that enables sharing of information between communication and ranging (e.g., radar or lidar). FIGS. 6A and 6B illustrate examples of JCR systems that may be implemented on wireless communication devices 602 and 604 according to some aspects. Although FIGS. 6A and 6B are directed to joint communication-radar systems, aspects may be similarly applicable to joint communication-lidar systems. In some examples, each of the wireless communication devices 602 and 604 may be a UE. For example, the UEs 602 and 604 may correspond to any of the sidelink (e.g., V2X) devices, D2D devices, or other UEs shown in any of FIGS. 1, 3, and 4.

In the example shown in FIG. 6A, each of the wireless communication devices 602 and 604 includes a respective JCR system 606 and 608. Each JCR system 606 and 608 includes a respective ranging device (e.g., radar device) 610 and 612 and a respective communication device 614 and 616. Each of the radar devices 610 and 612 may be configured to transmit respective radar signals and receive respective radar echoes of the radar signals reflected from nearby objects (e.g., scatterers). In addition, each of the communication devices 614 and 616 may be configured to transmit messages (e.g., signals, control information, and/or data) to the other wireless communication device. For example, the communication device 614 in the wireless communication device 602 may transmit a message, which may be received by the communication device 616 in wireless communication device 604.

The radar devices 610 and 612 are separate from the respective communication devices 614 and 616, and therefore, each wireless communication device 602 and 604 may include separate transceivers for radar and communication. For example, the radar device 610 may include a radar transceiver 618 and the communication device 614 may include a communication transceiver 620. In addition, the radar device 612 may include a radar transceiver 622 and the communication device 616 may include a communication transceiver 624. The respective radar devices 610 and 612 are illustrated in FIG. 6A as being co-located and cooperative with the respective communication devices 614 and 616, such that ranging information obtained by a ranging device (e.g., radar device 610) on a wireless communication device (e.g., wireless communication device 602) may be provided to the co-located communication device 614 on the wireless communication device to improve the performance of the communication device. Similarly, communication information obtained by the communication device 614 may be provided to the radar device 610 to improve the performance of the radar device 610. For a joint communication-lidar system, each wireless communication device 602 and 604 may include a lidar device that includes a laser and corresponding optics for transmission of light and reception of reflected light.

In the example shown in FIG. 6B, each of the wireless communication devices 602 and 604 includes a respective JCR system 626 and 628 that utilizes a respective common transceiver 630 and 632 for both communication and ranging (e.g., radar). Thus, the JCR systems 626 and 628 are co-designed communication and radar systems. The co-design may be radar-centric, communication-centric, or a shared joint-design. In some examples, the JCR systems 626 and 628 may include modifications in the transmit waveform generation, the receiver processing, or both to accommodate both radar/lidar and communication transmission/reception.

Figure 7:
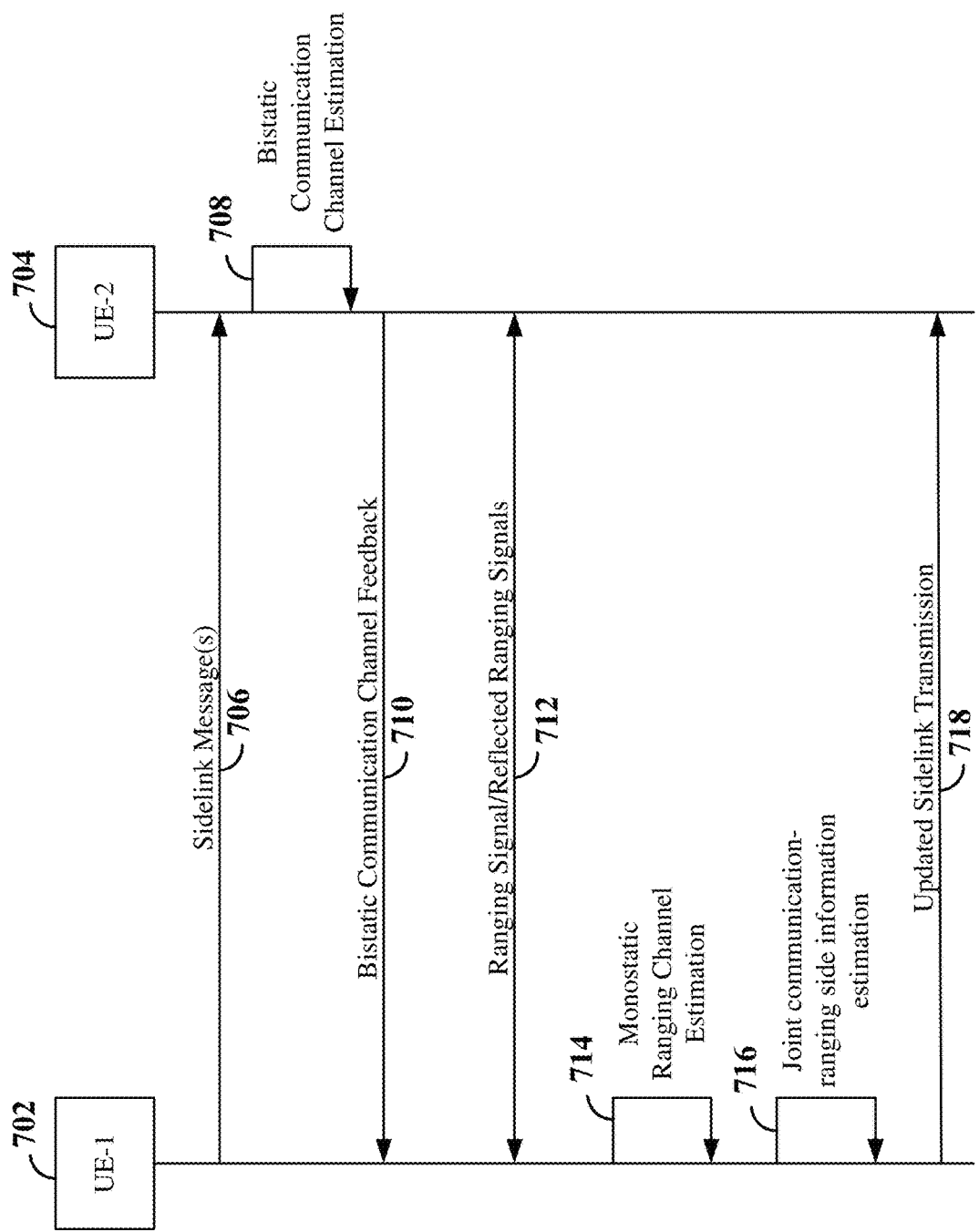
FIG. 7 is a signaling diagram illustrating exemplary signaling for joint communication-ranging channel estimation according to some aspects.

FIG. 7 is a signaling diagram illustrating exemplary signaling between wireless communication devices 702 and 704 for joint communication-ranging channel estimation according to some aspects. Each of the wireless communication devices 702 and 704 may be any of the UEs, sidelink (e.g., V2X, D2D, etc.) devices, or other scheduled entities shown in FIGS. 1-4.

At 707, a first wireless communication device (UE-1) 702 transmits one or more sidelink (e.g., V2X) messages over a bistatic communication channel (e.g., sidelink channel) to a second wireless communication device (UE-2) 704. The sidelink message(s) may include one or more sidelink reference signals and/or data. For example, the sidelink reference signals may include sidelink DMRS, sidelink CSI-RS, sidelink SSB (e.g., sidelink PSS/SSS), sidelink PRS, or any other suitable sidelink training/reference signal.

At 708, the UE-2 704 may estimate the bistatic communication channel based on the sidelink message(s) prior to decoding the sidelink message(s). For example, UE-2 704 may exploit the sidelink reference signals and/or data of the sidelink messages received in a single frame to estimate the discrete autocorrelation or power spectral density (PSD) of the bistatic communication channel. The channel autocorrelation is dependent on the Doppler shift profile of the communication channel due to the wave interaction between the two UEs (UE-1 702 and UE-2 704) and the surrounding objects around the UEs. As an example, for a uniform scattering environment that includes many scatterers densely packed with respect to angle, such as the one proposed by Jake's channel model, the autocorrelation function is equal to a product of a total received signal power and a Bessel function of the zeroth order with an argument that includes a maximum Doppler shift. For example, the autocorrelation function A for the in-phase received signal $r_I(t)$ may correspond to:

$$A_{r_I}(\tau) = P_r J_0(2\pi f_D \tau),\qquad \text{(Equation 1)}$$

where $P_r$ is the total received power across all multipath components in the uniform scattering environment, $f_D$ is the Doppler frequency, t is the multipath delay, $2\pi f_D \tau$ is the maximum Doppler shift, and $J_0$ is the Bessel function of zeroth order. The autocorrelation function for the quadrature-phase received signal $r_Q(t)$ may be equal to the autocorrelation function for the in-phase received signal $r_I(t)$.

Additionally, the corresponding PSD has a maximum value corresponding to the maximum Doppler shift of the channel. In particular, the PSD of $r_I(t)$ and $r_Q(t)$ may be obtained by taking the Fourier transform of their respective autocorrelation functions relative to the delay parameter t. Since the autocorrelation functions are equal, the PSDs may be similarly equal.

At 710, the UE-2 704 may transmit bistatic communication channel feedback to UE-1 702. In some examples, the bistatic communication channel feedback may include a set of autocorrelation samples of a plurality of autocorrelation samples. For example, the set of autocorrelation samples may include a first few (e.g., most important) autocorrelation samples of the plurality of autocorrelation samples. In other examples, the bistatic communication channel feedback may include the PSD, from which the UE-1 702 may obtain the set of autocorrelation samples based on a Fourier transform of the PSD.

At 712, the UE-1 702 may transmit a ranging signal, such as a radar signal or lidar signal, that may be reflected off UE-2 704 as reflected ranging signals (e.g., radar echoes or reflected light). For example, the UE-1 702 may include a radar transceiver or common JCR transceiver that transmits a radar signal periodically at a high rate to sense the environment. The radar signal may be reflected by surrounding objects (e.g., UE-2 704), and the resulting radar echoes may be received by the radar/common JCR transceiver in full-duplex configuration.

At 714, the UE-1 702 may estimate the monostatic ranging channel. For example, the UE-1 702 may estimate the ranging channel Doppler and angular profile. The ranging channel Doppler and angular profile may include a Doppler shift profile that indicates the Doppler spread of the two-way monostatic ranging channel between UE-1 702 and UE-2 704. From the Doppler and angular profile, the UE-1 702 may discern the distance to UE-2 704, the velocity of UE-2 704, and the angle of UE-2 704 with respect to UE-1.

At 716, the UE-1 702 may estimate joint communication-ranging (JCR) side information based on the monostatic ranging channel estimate and the bistatic communication channel feedback. In some examples, the UE-1 702 may obtain a communication channel Doppler profile based on the bistatic communication channel feedback. For example, UE-1 702 may be configured to solve an optimization algorithm to identify the scattering centers (e.g., centers of scatterers/scattering clusters) with Doppler shifts and spreads that correspond to the received (or obtained) autocorrelation samples. In some examples, the UE-1 702 may leverage the radar estimated Doppler parameters as a priori information to obtain the communication channel Doppler profile. The UE-1 702 may then associate and correlate the communication channel Doppler profile with the ranging channel Doppler and angular profile to obtain the JCR side information. The JCR side information may include, for example, a classification of the channel between UE-1 702 and UE-2 704 as LOS or non-LOS. In addition, the JCR side information may include target parameters (e.g., Doppler shift, range, and angle) of common scatterers. For example, if there is an association between ranging (e.g., radar) channel and communication channel estimates for a common scatterer, then the predicted target parameter estimation accuracy may be improved by taking a weighted average of the parameter estimate. In some examples, the weighting may be based on the error covariance of the target parameter estimated by the respective mode (e.g., radar or communication).

At 718, the UE-1 702 may transmit an updated sidelink transmission based on the JCR side information. For example, the UE-1 702 may transmit the updated sidelink transmission using a transmit power and/or beamforming parameter(s) selected based on the JCR side information. For example, the UE-1 702 may select a transmit beam for the updated sidelink transmission based on the JCR side information without needing to perform additional beam training. In some examples, the selected transmit beam may have a beamforming shape (e.g., narrow or wide beam width) and beam direction based on the JCR side information. It should be understood that aspects described herein may be applicable to any frequency range (FR), including FR1, FR2, or other FR.

Figure 8:
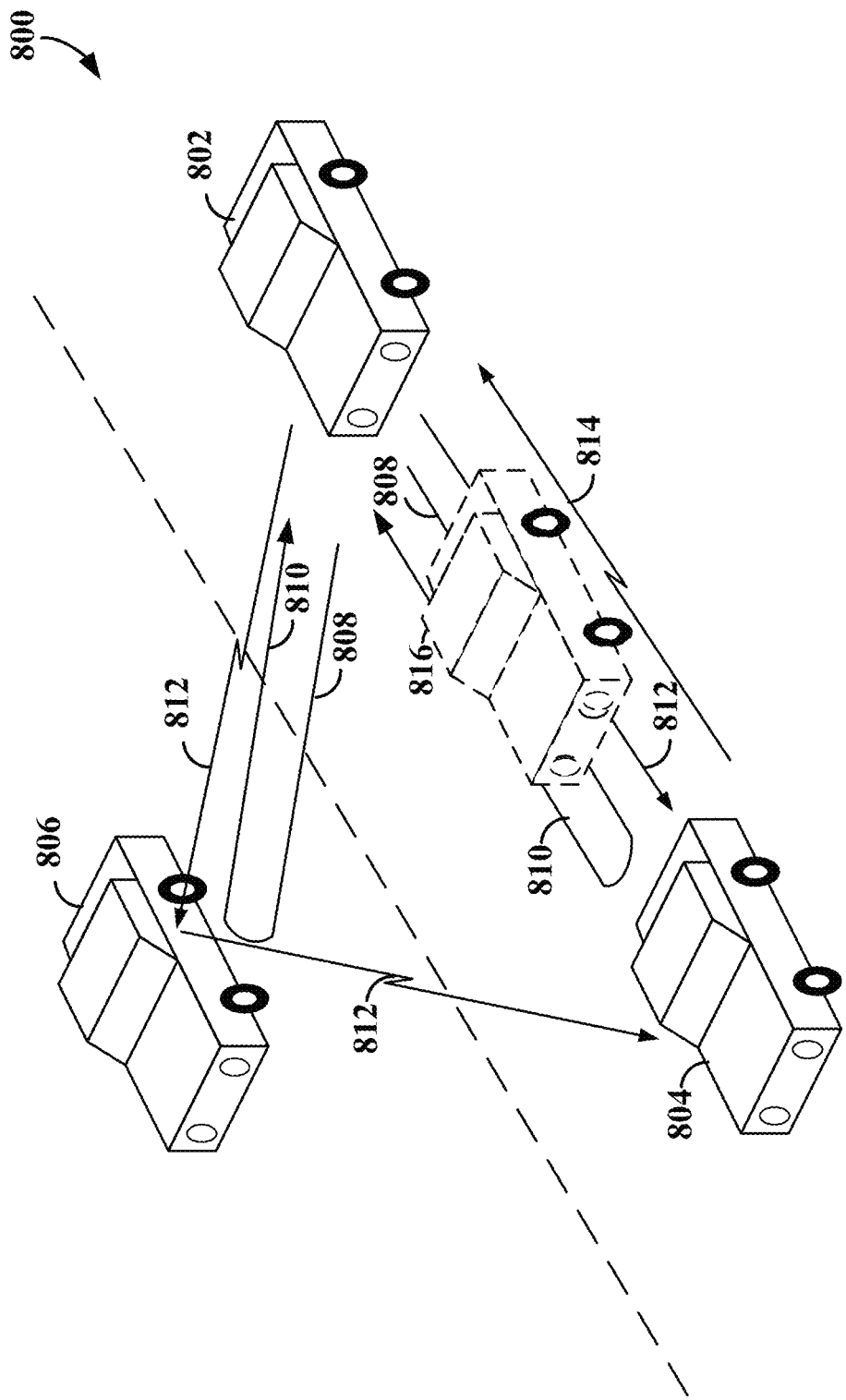
FIG. 8 is a diagram illustrating examples of joint communication-ranging channel estimation use cases according to some aspects.

FIG. 8 is a diagram illustrating examples of joint communication-ranging channel estimation use cases according to some aspects. In the example shown in FIG. 8, V-UE 802 is shown in proximity to V-UEs 804 and 806. V-UE 802 includes a ranging device (e.g., an automotive radar system or lidar system) and a transceiver. In some examples, the ranging device includes a separate ranging transceiver (e.g., radar transceiver). In other examples, the ranging device shares the transceiver with a communication device (e.g., for sidelink and/or cellular (Uu link) communication).

The ranging device of V-UE 802 may be configured to transmit a ranging signal 808 (e.g., a radar signal, or, in other examples, a lidar signal) periodically at a high rate to sense the environment. The radar signal 808 may be reflected by surrounding objects/scatterers (e.g., V-UEs 804 and 806), and the resulting reflected ranging signals 810 (e.g., radar echoes, or in other examples, reflected light) may be received by the ranging device. The received radar echoes 810 may then be processed to estimate the ranging channel Doppler and angular profile of respective two-way monostatic ranging channels between V-UE 802 and each of V-UEs 804 and 806.

In addition, the communication transceiver of V-UE 802 may be configured to transmit sidelink (e.g., V2X) message(s) 812 to V-UE 804, and to receive bistatic communication channel feedback 814 from V-UE 804. In some examples, the bistatic communication channel feedback may include a set of autocorrelation samples or a power spectral density from which the V-UE 802 may estimate the bistatic communication channel Doppler profile of the bistatic communication channel between V-UE 802 and V-UE 804. The V-UE 802 may then associate and correlate the communication channel Doppler profile with the ranging channel Doppler and angular profile to obtain the JCR side information, as discussed above.

In an example use case, based on the association and correlation of the communication channel Doppler profile with the ranging channel Doppler and angular profile, the resulting JCR side information may indicate that there is a LOS link between V-UE 802 and V-UE 804. For example, there is a one-to-one correspondence between a scatterer (e.g., V-UE 804) observed by the communication transceiver of V-UE 804 and a scatterer (e.g., V-UE 802) observed by the radar transceiver at V-UE 802. Thus, if the communication Doppler shift of scatterer V-UE 804 is approximately half that of the ranging Doppler shift of scatterer V-UE 802, this suggests that there is a line-of-sight (LOS) communication link between V-UE 802 and V-UE 804. Once a LOS communication link is detected, the V-UE 802 may select a transmit beam for the LOS communication link. In an example, the selected transmit beam may have a beamforming shape (e.g., a narrow beam width) to increase the communication data rate. In addition, the V-UE 802 may reduce the transmit power for a LOS link. The ranging Doppler shift of scatterer V-UE 804 may further be used to enhance the communication synchronization of the sidelink between V-UE 802 and V-UE 804.

In another example use case, an obstruction between V-UE 802 and V-UE 804 may disrupt the LOS link between V-UE 802 and V-UE 804. For example, another vehicle (e.g., V-UE 816) without V2X support may enter the road between V-UE 802 and V-UE 804. This V-UE 816 may block the LOS link between V-UE 802 and V-UE 804. In this example, the JCR side information may indicate that there is non-LOS link between V-UE 802 and V-UE 804. The JCR side information may further be utilized by V-UE 802 to identify the best scatterer to bounce-off V2X transmissions for non-LOS communication.

For example, the association and correlation of the communication channel Doppler profile with the ranging channel Doppler and angular profile may indicate that V-UE 802 and V-UE 804 each have a respective LOS link with the same scatterer or scattering cluster (e.g., V-UE 806). For example, if there is an association between the ranging Doppler profile of the scatterer V-UE 806 observed by the ranging device of V-UE 802 and the communication Doppler profile observed by the transceiver of V-UE 804, this suggests that V-UE 802 and V-UE 804 each have a LOS link with the same scatterer V-UE 806. When a target (e.g., scatterer or scattering cluster) is LOS to both V-UE 802 and V-UE 804, the JCR side information obtained by combining the ranging channel Doppler and angular profile with the communication channel Doppler profile may lead to higher resolution and accuracy of the resulting combined Doppler profile, which may be utilized for improved subsequent radar parameter estimation and for communication synchronization.

In some examples, the V-UE 802 may further identify multiple potential targets (e.g., scatterers) for non-LOS communication using the JCR side information. The V-UE 802 may then select one of the targets with low Doppler shift and high Doppler spread for non-LOS communication. Low Doppler shift may enable a longer duration to bounce-off the signals, whereas high Doppler spread signifies a larger object. Once the target (e.g., V-UE 806) is selected for reflection of sidelink transmissions from V-UE 802 to V-UE 804, the V-UE 802 can further utilize the JCR side information to select a transmit beam to direct the sidelink transmissions towards the target for reflection thereof to the V-UE 804. In an example, the selected transmit beam may have a beamforming shape (e.g., narrow or wide beam width) selected to increase the communication data rate and/or reduce the transmit power.

Figure 9:
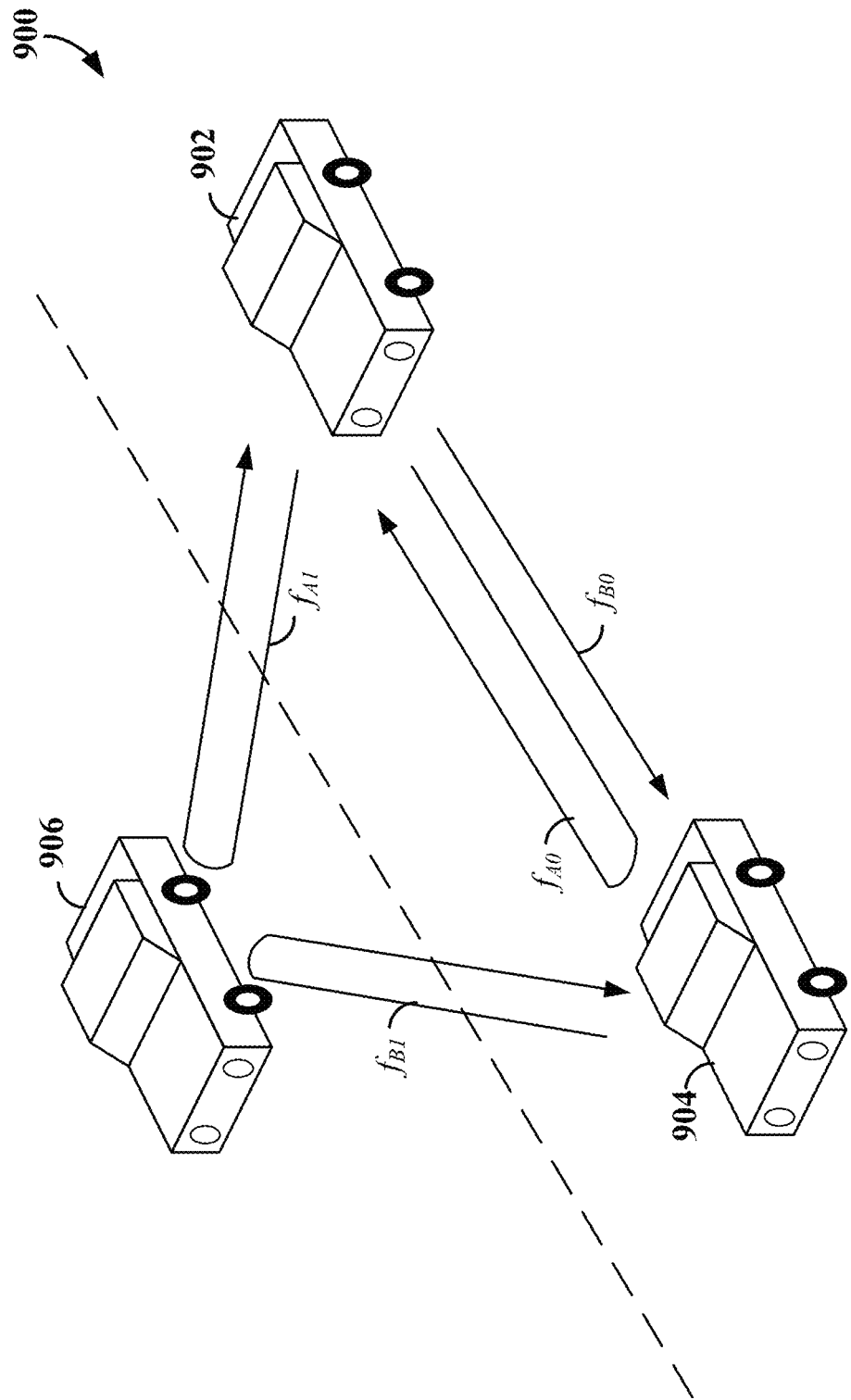
FIG. 9 is a diagram illustrating an example of line-of-sight (LOS) and non-LOS joint communication-ranging channel estimation according to some aspects.

FIG. 9 is a diagram illustrating examples of line-of-sight (LOS) and non-LOS joint communication-ranging channel estimation according to some aspects. In the example shown in FIG. 9, V-UE 902 is shown in proximity to V-UEs 904 and 906. V-UE 902 includes a ranging device (e.g., an automotive radar system or lidar system) and a transceiver. In some examples, the ranging device includes a separate ranging transceiver (e.g., radar transceiver). In other examples, the ranging device shares the transceiver with a communication device (e.g., for sidelink and/or cellular (Uu link) communication).

FIG. 9 illustrates the Doppler shifts observed between V-UEs 902, 904, and 906. For example, for a LOS channel between the V-UE 902 and V-UE 904, the ranging device (e.g., radar device) at V-UE 902 may observe a Doppler shift $f_{A0}$ corresponding to V-UE 904 and the communication transceiver at V-UE 904 may observe a Doppler shift $f_{B0}$ corresponding to V-UE 902. The relationship between the LOS Doppler shifts observed by the ranging device and communication transceiver may be given by:

$$f_{A0}=2f_{B0}. \quad \text{(Equation 2)}$$

In addition, irrespective of whether the link between V-UE 902 and V-UE 904 is LOS or non-LOS (NLOS), V-UE 902 and V-UE 904 may each observe common scatterers, such as V-UE 906. In this example, the Doppler shift corresponding to the common scatterer V-UE 906 observed by the communication transceiver of V-UE 904 is given by:

$$f_{AB1}=(f_{A1}+f_{B1})/2, \quad \text{(Equation 3)}$$

where $f_{A1}$ is the radial Doppler shift observed by the ranging device (e.g., radar device) at V-UE 902 and is related to the velocity $v_{A1}$ observed by the V-UE 902 in the radial direction as:

$$f_{A1}=2v_{A1}/\lambda. \quad \text{(Equation 4)}$$

Here, $\lambda$ is the carrier wavelength of the transmit signal. Similarly, $f_{B1}$ is the Doppler shift corresponding to the scatterer V-UE 906 in the radial direction between the V-UE 904 and the V-UE 906. If V-UE 904 includes a ranging device, V-UE 904 can further estimate $f_{B1}$, similar to V-UE 902.

If, based on Equation 2 above, a common scattering cluster is identified having a monostatic Doppler shift value estimated by the ranging device at V-UE 902 close to twice the bistatic Doppler shift estimated by the communication transceiver at V-UE 904, an association between the ranging and communication channels may be determined, where the common scattering cluster corresponds to the direct path. In this example, the communication path is LOS since there is a one-to-one association of the direct path.

If the communication channel is classified as a LOS channel based on the association between the ranging and communication channels, the V-UE 902 may select, for example, narrow transmit beams to communicate sidelink signals with the V-UE 904. The direction of the selected narrow transmit beams may be selected, for example, using the ranging device.

For scattering clusters that are common between the ranging channel at V-UE 902 and the communication channel at V-UE 904, the association and correlation can be performed based on either a similar ranging device at the V-UE 904 or with knowledge of the location and velocity of the V-UE 904. For example, if the V-UE 904 is also equipped with a ranging device (e.g., a radar device), then the scatterers whose monostatic Doppler shift estimated by the ranging device and bi-static Doppler shift estimated by the communication transceiver at V-UE 904 follow Equation 3 may be considered common scatterers for a NLOS communication channel. As another example, if the relative radial velocity and location of the V-UE 904 with respect to the V-UE 902 (e.g., $f_{BO}$) are known (e.g., using GPS, speedometer, etc.), then the NLOS scatterers can be associated using, for example, triangulation techniques (e.g., using the law of sines or cosines).

If the communication channel is classified as a NLOS channel based on there being no association corresponding to the direct path, the V-UE 902 may select, for example, one or more common scatterers (e.g., V-UE 906) to reflect sidelink signals towards the V-UE 904. In this example, the transmit beam(s) may be selected to direct the sidelink signals towards one or more of the common scatterers (e.g., V-UE 906) with or without pruning. In some examples, pruning may be enabled by testing the directions of selected scatterers (e.g., one or a few at a time) and choosing the best (or a few best) directions that result in the best received signal-to-noise ratio (SNR) at the V-UE 904.

Figure 10:
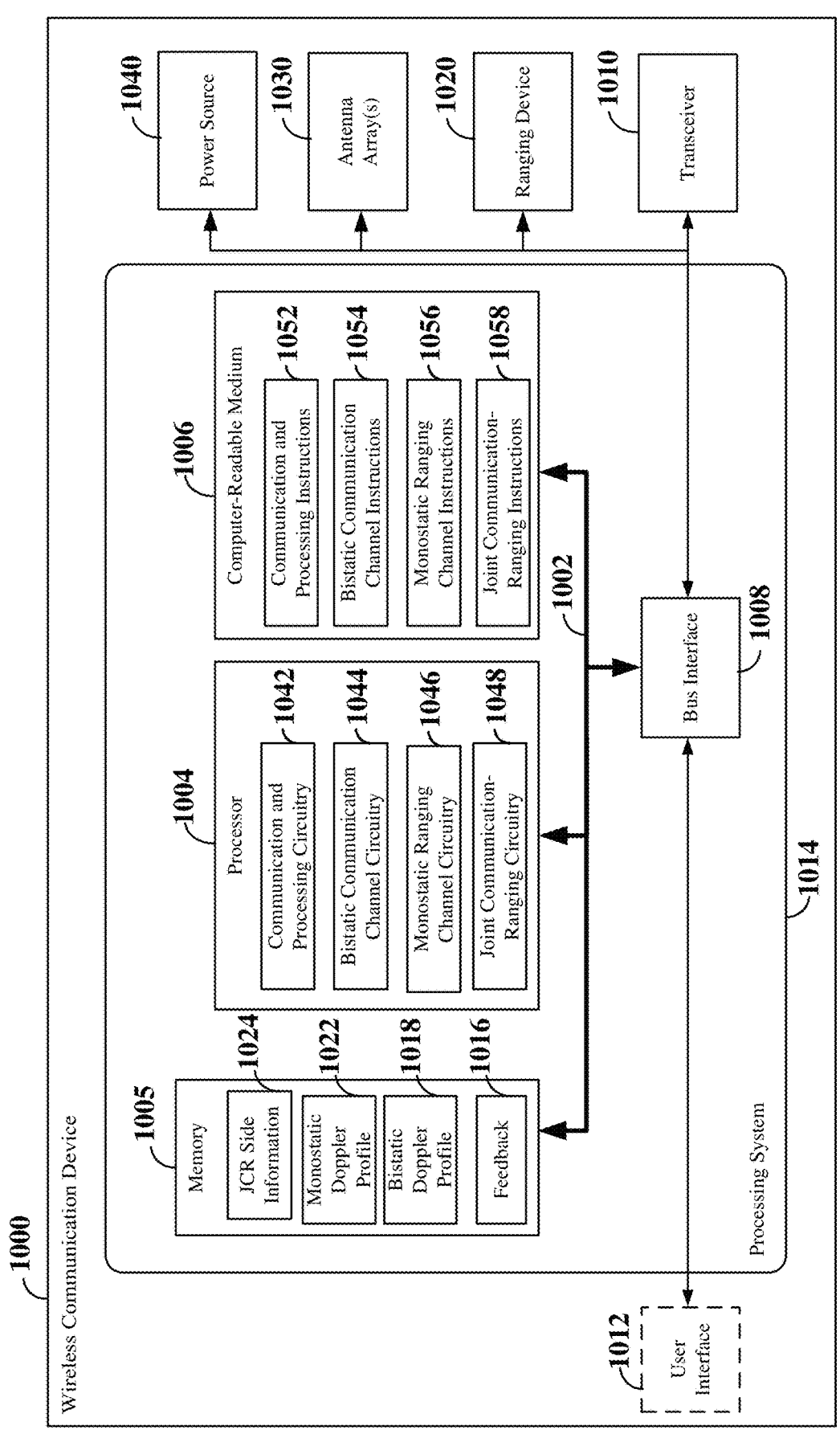
FIG. 10 is a block diagram illustrating an example of a hardware implementation for a wireless communication device employing a processing system according to some aspects.

FIG. 10 is a block diagram illustrating an example of a hardware implementation for a wireless communication device 1000 employing a processing system 1014. For example, the wireless communication device 1000 may correspond to a sidelink device, such as a V2X device, D2D device or other UE or wireless communication device configured for sidelink or D2D communication, as shown and described above in reference to FIGS. 1 and/or 3-7.

The wireless communication device 1000 may be implemented with a processing system 1014 that includes one or more processors 1004. Examples of processors 1004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 1000 may be configured to perform any one or more of the functions described herein. That is, the processor 1004, as utilized in the wireless communication device 1000, may be used to implement any one or more of the processes and procedures described below.

The processor 1004 may in some instances be implemented via a baseband or modem chip and in other implementations, the processor 1004 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1014 may be implemented with a bus architecture, represented generally by the bus 1002. The bus 1002 may include any number of interconnecting buses and bridges depending on the specific application of the processing system 1014 and the overall design constraints. The bus 1002 links together various circuits including one or more processors (represented generally by the processor 1004), a memory 1005, and computer-readable media (represented generally by the computer-readable medium 1006). The bus 1002 may also link various other circuits such as timing sources, peripherals, voltage regulators, and power management circuits, which are well known in the art, and therefore, will not be described any further.

A bus interface 1008 provides an interface between the bus 1002, a communication transceiver 1010, one or more antenna arrays 1030, and a power source 1040 (e.g., a battery and power control circuit). The communication transceiver 1010 provides a communication interface or a means for communicating with various other apparatus over a transmission medium (e.g., air interface). The antenna array(s) 1030 are coupled to the communication transceiver 1010 and provide a means for beamforming to communicate via transmit/receive beams. The bus interface 1008 further provides an interface between the bus 1002 and a ranging device 1020 (e.g., which may be either a radar transceiver or a lidar system, such as a laser and optics). The ranging device 1020 provides a means for transmitting ranging signals and receiving reflected ranging signals. In some examples, the ranging device 1020 may be configured to operate in a full-duplex manner. Although not shown, the ranging device 1020 may be coupled to a ranging antenna/antenna array. In some examples, a common/shared transceiver may be used for both communication and ranging. Depending upon the nature of the apparatus, a user interface 1012 (e.g., keypad, display, touch screen, speaker, microphone, control knobs, etc.) may also be provided. Of course, such a user interface 1012 is optional, and may be omitted in some examples.

The processor 1004 is responsible for managing the bus 1002 and general processing, including the execution of software stored on the computer-readable medium 1006. The software, when executed by the processor 1004, causes the processing system 1014 to perform the various functions described below for any particular apparatus. The computer-readable medium 1006 and the memory 1005 may also be used for storing data that is manipulated by the processor 1004 when executing software. For example, the memory 1005 may store bistatic communication channel feedback (Feedback) 1016, a bistatic communication channel Doppler profile (Bistatic Doppler Profile) 1018, a ranging channel Doppler and angular profile (Monostatic Doppler Profile) 1022, and joint communication-ranging (JCR) side information (JCR Side Information) 1024, which may be used by the processor 1004 in sidelink communication and radar (ranging) parameter estimation.

One or more processors 1004 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1006.

The computer-readable medium 1006 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1006 may reside in the processing system 1014, external to the processing system 1014, or distributed across multiple entities including the processing system 1014. The computer-readable medium 1006 may be embodied in a computer program product. By way of example, a computer program product may include a computer-readable medium in packaging materials. In some examples, the computer-readable medium 1006 may be part of the memory 1005. Those skilled in the art will recognize how best to implement the described functionality presented throughout this disclosure depending on the particular application and the overall design constraints imposed on the overall system.

In some aspects of the disclosure, the processor 1004 may include circuitry configured for various functions. For example, the processor 1004 may include communication and processing circuitry 1042, configured to communicate with one or more sidelink devices (e.g., other UEs) via respective sidelinks (e.g., PC5 interfaces). In addition, the communication and processing circuitry 1042 may be configured to communicate with a base station (e.g., gNB or eNB) via a Uu link. In some examples, the communication and processing circuitry 1042 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1042 may include one or more transmit/receive chains.

In some implementations where the communication involves receiving information, the communication and processing circuitry 1042 may obtain information from a component of the wireless communication device 1000 (e.g., from the communication transceiver 1010 that receives the information via radio frequency signaling or some other type of signaling suitable for the applicable communication medium), process (e.g., decode) the information, and output the processed information. For example, the communication and processing circuitry 1042 may output the information to another component of the processor 1004, to the memory 1005, or to the bus interface 1008. In some examples, the communication and processing circuitry 1042 may receive one or more of signals, messages, other information, or any combination thereof. In some examples, the communication and processing circuitry 1042 may receive information via one or more channels. In some examples, the communication and processing circuitry 1042 may include functionality for a means for receiving. In some examples, the communication and processing circuitry 1042 may include functionality for a means for processing, including a means for demodulating, a means for decoding, etc.

In some implementations where the communication involves sending (e.g., transmitting) information, the communication and processing circuitry 1042 may obtain information (e.g., from another component of the processor 1004, the memory 1005, or the bus interface 1008), process (e.g., modulate, encode, etc.) the information, and output the processed information. For example, the communication and processing circuitry 1042 may output the information to the communication transceiver 1010 (e.g., that transmits the information via radio frequency signaling or some other type of signaling suitable for the applicable communication medium). In some examples, the communication and processing circuitry 1042 may send one or more of signals, messages, other information, or any combination thereof. In some examples, the communication and processing circuitry 1042 may send information via one or more channels. In some examples, the communication and processing circuitry 1042 may include functionality for a means for sending (e.g., a means for transmitting). In some examples, the communication and processing circuitry 1042 may include functionality for a means for generating, including a means for modulating, a means for encoding, etc.

In some examples, the communication and processing circuitry 1042 may be configured to transmit sidelink message(s) via the communication transceiver 1010 and antenna array(s) 1030 from the wireless communication device 1000 (e.g., a transmitting wireless communication device) to another wireless communication device (e.g., a receiving wireless communication device). The sidelink messages (e.g., V2X messages) may include reference signal(s) and/or data. The communication and processing circuitry 1042 may further be configured to receive bistatic communication channel feedback 1016 from the receiving wireless communication device via the communication transceiver 1010 and antenna array(s) 1030. The bistatic communication channel feedback 1016 may include, for example, a set of initial autocorrelation samples of a plurality of autocorrelation samples or a power spectral density of a bistatic communication channel between the transmitting and receiving wireless communication devices. The communication and processing circuitry 1042 may further be configured to store the bistatic communication channel feedback 1016 within, for example, memory 1005.

The communication and processing circuitry 1042 may further be configured to transmit an updated sidelink transmission (e.g., V2X transmission) via the communication transceiver 1010 and antenna array(s) 1030 to the receiving wireless communication device. The communication and processing circuitry 1042 may further be configured to execute communication and processing instructions (software) 1052 stored in the computer-readable medium 1006 to implement one or more of the functions described herein.

The processor 1004 may further include bistatic communication channel circuitry 1044, configured to process the bistatic communication channel feedback 1016 to obtain a communication channel Doppler profile 1018 of the bistatic communication channel. The bistatic communication channel circuitry 1044 may further be configured to store the obtained communication channel Doppler profile 1018 within, for example, memory 1005. The bistatic communication channel circuitry 1044 may further be configured to execute bistatic communication channel instructions (software) 1054 stored in the computer-readable medium 1006 to implement one or more of the functions described herein.

The processor 1004 may further include monostatic ranging channel circuitry 1046, configured to operate together with the communication and processing circuitry 1042 to generate and transmit, via the ranging device 1020, a ranging signal (e.g., a radar or lidar signal) and to receive reflected ranging signals (e.g., radar echoes or reflected light) based on the ranging signal. In some examples, the monostatic ranging channel circuitry 1046 may be configured to generate and transmit ranging signals periodically at a high rate. The monostatic ranging channel circuitry 1046 may further be configured to process the received reflected ranging signals to estimate the channel parameters of the respective monostatic ranging channel between the wireless communication device 1000 and each of a plurality of surrounding objects (e.g., scatterers or scattering clusters). The channel parameters that may be estimated using the reflected ranging signals may include, for example, the Doppler shift profile and angular profile (e.g., the radar channel Doppler and angular profile). For example, the monostatic ranging channel circuitry 1046 may estimate the ranging Doppler and angular profile 1022 of the monostatic ranging channel between the transmitting and receiving wireless communication devices. The monostatic ranging channel circuitry 1046 may further be configured to store the ranging Doppler and angular profile (e.g., Monostatic Doppler Profile 1022) within, for example, memory 1005. The monostatic ranging channel circuitry 1046 may further be configured to execute monostatic radar channel instructions (software) 1056 stored in the computer-readable medium 1006 to implement one or more of the functions described herein.

The processor 1004 may further include joint communication-ranging (JCR) circuitry 1048, configured to associate and correlate the communication channel Doppler profile 1018 with the ranging channel Doppler and angular profile 1022 to obtain the joint communication-ranging (JCR) side information 1024. The JCR circuitry 1048 may further be configured to store the JCR side information 1024 within, for example, memory 1005. In some examples, the JCR circuitry 1048 may further be configured to operate together with the communication and processing circuitry 1042 to select a transmit power and/or beamforming parameter(s) for the updated sidelink transmission based on the JCR side information 1024.

For example, the JCR circuitry 1048 may be configured to select a transmit beam having the selected beamforming parameter (e.g., beam direction and/or beam width) for the updated sidelink transmission based on the JCR side information 1024. In some examples, the transmit beam may be a narrow transmit beam in response to the JCR side information 1024 indicating a LOS communication link between the transmitting and receiving wireless communication devices. In some examples, the transmit beam may have a beam direction directed towards a target for reflection of the updated sidelink transmission from the transmitting wireless communication device to the receiving wireless communication device in response to the JCR side information 1024 indicating a non-LOS communication link between the transmitting and receiving wireless communication devices. In this example, the JCR circuitry 1048 may further be configured to select a beam width (e.g., narrow or wide) of the transmit beam. The JCR circuitry 1048 may further be configured to identify the target for reflection of the updated sidelink transmission based on the JCR side information 1024.

The JCR circuitry 1048 may further be configured to control the power source 1040 to modify the transmit power of the updated sidelink transmission based on the JCR side information 1024. For example, the JCR circuitry 1048 may be configured to reduce the transmit power upon selecting a transmit beam (e.g., beam direction and beam width) that provides a LOS communication link or non-LOS communication link based on the JCR side information 1024. The JCR circuitry 1048 may further be configured to update the communication synchronization between the transmitting and receiving wireless communication devices based on the JCR side information 1024.

The JCR circuitry 1048 may further be configured to update the monostatic ranging channel estimate based on the JCR side information 1024. For example, the JCR circuitry 1048 may operate together with the monostatic ranging channel circuitry 1046 to transmit an additional ranging signal and receive additional reflected ranging signals based on the additional ranging signal. The JCR circuitry 1048 may further operate together with the monostatic ranging channel circuitry 1046 to obtain a new (updated) monostatic ranging channel estimate based on not only the additional reflected ranging signals, but also the JCR side information 1024. The JCR circuitry 1048 may further be configured to execute JCR instructions (software) 1058 stored in the computer-readable medium 1006 to implement one or more of the functions described herein.

Figure 11:
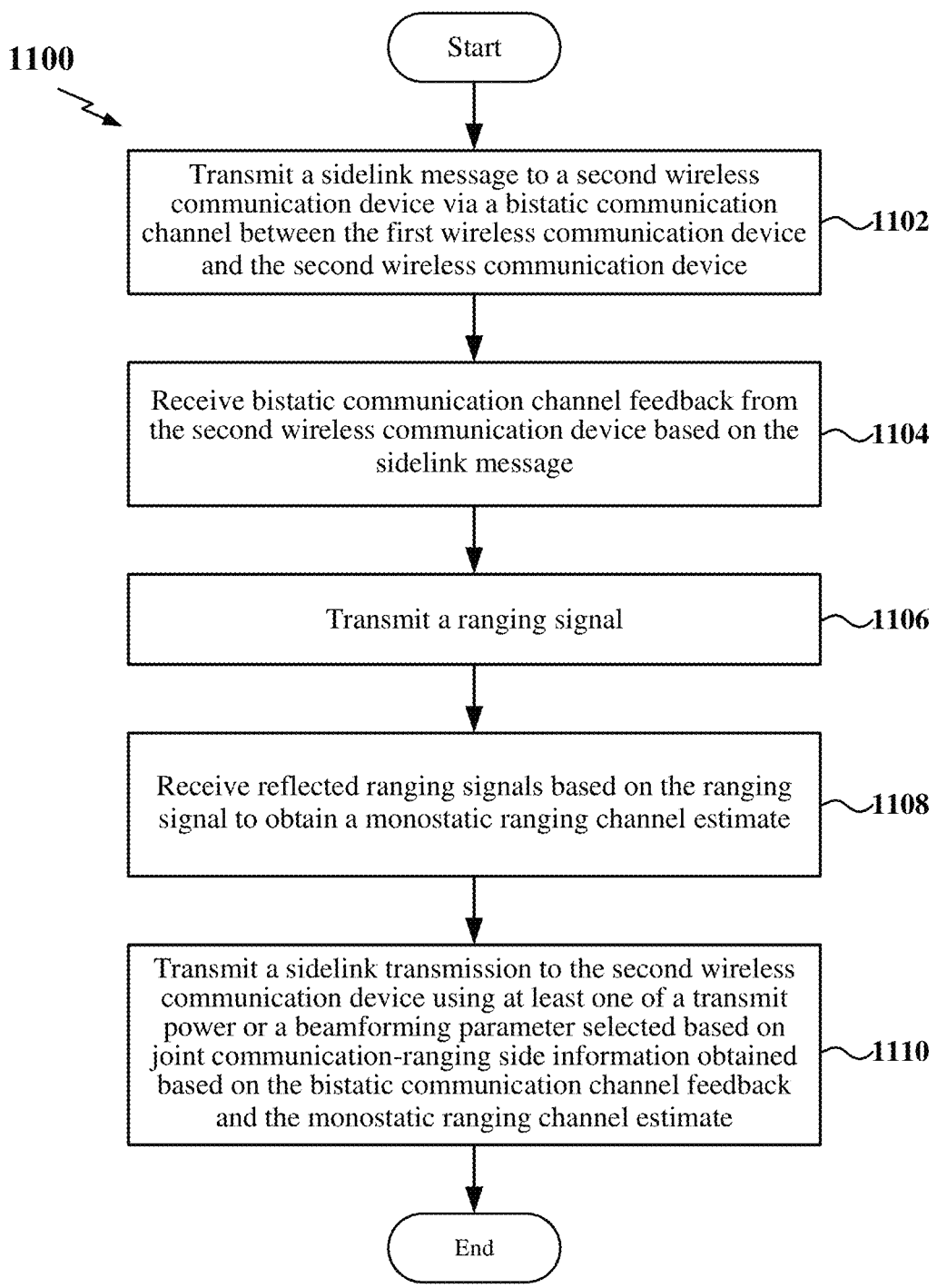
FIG. 11 is a flow chart of an exemplary method for joint communication-ranging channel estimation according to some aspects.

FIG. 11 is a flow chart 1100 of an exemplary method for joint communication-ranging channel estimation according to some aspects. As described below, some or all illustrated features may be omitted in a particular implementation within the scope of the present disclosure, and some illustrated features may not be required for implementation of all examples. In some examples, the method may be performed by the wireless communication device 1000, as described above and illustrated in FIG. 10, by a processor or processing system, or by any suitable means for carrying out the described functions.

At block 1102, the wireless communication device (e.g., a first wireless communication device configured for sidelink communication) may transmit a sidelink message to a second wireless communication device via a bistatic communication channel between the first wireless communication device and the second wireless communication device. For example, the communication and processing circuitry 1042, together with the transceiver 1010 and antenna array(s) 1030, shown and described above in connection with FIG. 10, may provide a means to generate and transmit the sidelink message.

At block 1104, the first wireless communication device may receive bistatic communication channel feedback from the second wireless communication device based on the sidelink message. In some examples, the bistatic communication channel feedback includes a set of initial autocorrelation samples of a plurality of autocorrelation samples. In other examples, the bistatic communication channel feedback includes a power spectral density of the bistatic communication channel. For example, the communication and processing circuitry 1042, bistatic communication channel circuitry 1044, transceiver 1010, and antenna array(s) 1030, shown and described above in connection with FIG. 10 may provide a means to receive the bistatic communication channel feedback.

At block 1106, the first wireless communication device may transmit a ranging signal. For example, the monostatic ranging channel circuitry 1046 and ranging device 1020 shown and described above in connection with FIG. 10 may provide a means to transmit the ranging signal.

At block 1108, the first wireless communication device may receive reflected ranging signals based on the ranging signal to obtain a monostatic ranging channel estimate. In some examples, the first wireless communication device may estimate the monostatic ranging channel estimate based on the reflected ranging signals. The monostatic ranging channel estimate may include, for example, a ranging channel Doppler and angular profile. For example, the monostatic ranging channel circuitry 1046 and ranging device 1020 shown and described above in connection with FIG. 10 may provide a means to receive and process the reflected ranging signals.

At block 1110, the first wireless communication device may transmit a sidelink transmission (e.g., an updated sidelink transmission) to the second wireless communication device using at least one of a transmit power or a beamforming parameter selected based on joint communication-ranging (JCR) side information obtained based on the bistatic communication channel feedback and the monostatic ranging channel estimate. In some examples, the first wireless communication device may obtain a communication channel Doppler profile based on the bistatic communication channel feedback. The first wireless communication device may then associate and correlate the communication channel Doppler profile with the ranging channel Doppler and angular profile to obtain the JCR side information.

In some examples, the first wireless communication device may select a transmit beam having the beamforming parameter (e.g., beam direction and/or beam width) based on the JCR side information. For example, the transmit beam may include a narrow beam width in response to the joint communication-ranging side information indicating a line-of-sight communication link between the first wireless communication device and the second wireless communication device. As another example, the transmit beam may include a beam direction directed towards a target for reflection of the sidelink transmission in response to the joint communication-ranging side information indicating a non-line-of-sight communication link between the first wireless communication device and the second wireless communication device. For example, the communication and processing circuitry 1042, together with the JCR circuitry 1048, communication transceiver 1010, and antenna array(s) 1030, shown and described above in connection with FIG. 10 may provide a means to transmit the sidelink transmission using a transmit power and/or beamforming parameter selected based on the JCR side information.

In some examples, the first wireless communication device may further transmit an additional ranging signal and receive additional reflected ranging signals based on the additional ranging signal. In this example, the first wireless communication device may further obtain a new monostatic ranging channel estimate based on the additional reflected ranging signals and the JCR side information.

Figure 12:
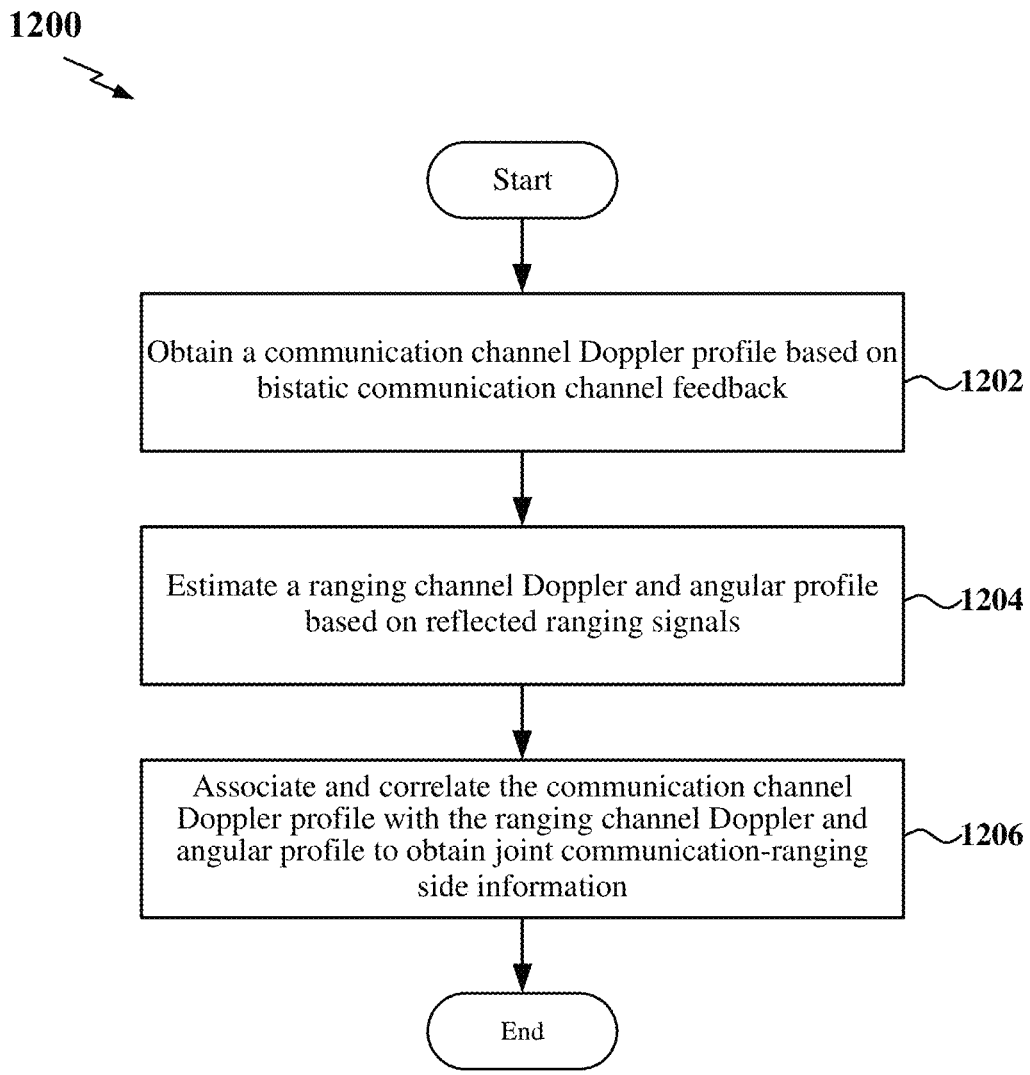
FIG. 12 is a flow chart of another exemplary method for joint communication-ranging channel estimation according to some aspects.

FIG. 12 is a flow chart 1200 of another exemplary method for joint communication-ranging channel estimation according to some aspects. As described below, some or all illustrated features may be omitted in a particular implementation within the scope of the present disclosure, and some illustrated features may not be required for implementation of all examples. In some examples, the method may be performed by the wireless communication device 1000, as described and illustrated in FIG. 10, by a processor or processing system, or by any suitable means for carrying out the described functions.

At block 1202, the wireless communication device (e.g., a first wireless communication device configured for sidelink communication) may obtain a communication channel Doppler profile based on bistatic communication channel feedback received from a second wireless communication device in response to transmission of a sidelink message. In some examples, the bistatic communication channel feedback includes a set of initial autocorrelation samples of a plurality of autocorrelation samples. In other examples, the bistatic communication channel feedback includes a power spectral density of the bistatic communication channel. For example, the bistatic communication channel circuitry 1044 shown and described above in connection with FIG. 10 may provide a means to obtain the communication channel Doppler profile.

At block 1204, the first wireless communication device may estimate a ranging channel Doppler and angular profile based on reflected ranging signals received in response to transmission of a ranging signal. For example, the monostatic ranging channel circuitry 1046 shown and described above in connection with FIG. 10 may provide a means to estimate the ranging channel Doppler and angular profile.

At block 1208, the first wireless communication device may associate and correlate the communication channel Doppler profile with the ranging channel Doppler and angular profile to obtain joint communication-ranging (JCR) side information. For example, the JCR circuitry 1048 shown and described above in connection with FIG. 10 may provide a means to obtain the JCR side information.

In one configuration, the wireless communication device 1000 includes means for transmitting a sidelink message to a second wireless communication device via a bistatic communication channel between the first wireless communication device and the second wireless communication device and means for receiving bistatic communication channel feedback from the second wireless communication device based on the sidelink message, as described in the present disclosure. The wireless communication device 1000 further includes means for transmitting a ranging signal, means for receiving reflected ranging signals based on the ranging signal to obtain a monostatic ranging channel estimate, and means for transmitting a sidelink transmission to the second wireless communication device using at least one of a transmit power or a beamforming parameter selected based on joint communication-ranging side information obtained based on the bistatic communication channel feedback and the monostatic ranging channel estimate, as described in the present disclosure. In one aspect, the aforementioned means may be the processor 1004 shown in FIG. 10 configured to perform the functions recited by the aforementioned means. In another aspect, the aforementioned means may be a circuit or any apparatus configured to perform the functions recited by the aforementioned means.

Of course, in the above examples, the circuitry included in the processor 1004 is merely provided as an example, and other means for carrying out the described functions may be included within various aspects of the present disclosure, including but not limited to the instructions stored in the computer-readable storage medium 1006, or any other suitable apparatus or means described in any one of the FIGS. 1 and/or 3-10, and utilizing, for example, the processes and/or algorithms described herein in relation to FIGS. 11 and 12.

The processes shown in FIGS. 11-12 may include additional aspects, such as any single aspect or any combination of aspects described below and/or in connection with one or more other processes described elsewhere herein.

Aspect 1: A method for wireless communication at a first wireless communication device configured for wireless communication, the method comprising: transmitting a sidelink message to a second wireless communication device via a bistatic communication channel between the first wireless communication device and the second wireless communication device; receiving bistatic communication channel feedback from the second wireless communication device based on the sidelink message; transmitting a ranging signal; receiving reflected ranging signals based on the ranging signal to obtain a monostatic ranging channel estimate; and transmitting a sidelink transmission to the second wireless communication device using at least one of a transmit power or a beamforming parameter selected based on joint communication-ranging side information, wherein the joint communication-ranging side information is based on the bistatic communication channel feedback and the monostatic ranging channel estimate.

Aspect 2: The method of aspect 1, wherein the bistatic communication channel feedback comprises a set of initial autocorrelation samples of a plurality of autocorrelation samples.

Aspect 3: The method of aspect 1, wherein the bistatic communication channel feedback comprises a power spectral density of the bistatic communication channel.

Aspect 4: The method of any of aspects 1 through 3, further comprising: obtaining a communication channel Doppler profile based on the bistatic communication channel feedback; and estimating the monostatic ranging channel estimate based on the reflected ranging signals, wherein the monostatic ranging channel estimate comprises a ranging channel Doppler and angular profile.

Aspect 5: The method of aspect 4, further comprising: associating and correlating the communication channel Doppler profile with the ranging channel Doppler and angular profile to obtain the joint communication-ranging side information.

Aspect 6: The method of any of aspects 1 through 5, further comprising: transmitting an additional ranging signal; receiving additional reflected ranging signals based on the additional ranging signal; and obtaining a new monostatic ranging channel estimate based on the additional reflected ranging signals and the joint communication-ranging side information.

Aspect 7: The method of any of aspects 1 through 6, further comprising: selecting a transmit beam comprising the beamforming parameter for the sidelink transmission based on the joint communication-ranging side information.

Aspect 8: The method of aspect 7, wherein the transmit beam comprises a narrow beam width in response to the joint communication-ranging side information indicating a line-of-sight communication link between the first wireless communication device and the second wireless communication device.

Aspect 9: The method of aspect 7, wherein the transmit beam comprises a beam direction directed towards a target for reflection of the sidelink transmission in response to the joint communication-ranging side information indicating a non-line-of-sight communication link between the first wireless communication device and the second wireless communication device.

Aspect 10: A first wireless communication device configured for wireless communication comprising a transceiver, a ranging device, a memory, and a processor coupled to the transceiver, the ranging device and the memory, the processor and the memory configured to perform a method of any one of aspects 1 through 9.

Aspect 11: A first wireless communication device configured for wireless communication comprising means for performing a method of any one of aspects 1 through 9.

Aspect 12: A non-transitory computer-readable medium having stored therein instructions executable by one or more processors of a first wireless communication device configured for wireless communication to perform a method of any one of aspects 1 through 9.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-12 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1 and/or 3-10 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus at a first wireless communication device, comprising:
   one or more transceivers;
   one or more ranging devices;
   one or more memories; and
   one or more processors coupled to the one or more transceivers, the one or more ranging devices, and the one or more memories, wherein the one or more processors are configured to:
      transmit a sidelink message to a second wireless communication device via a bistatic communication channel between the first wireless communication device and the second wireless communication device via the one or more transceivers;
      receive bistatic communication channel feedback from the second wireless communication device via the one or more transceivers, the bistatic communication channel feedback being generated by the second wireless communication device based on the sidelink message, wherein the bistatic communication channel feedback comprises at least one of a set of initial autocorrelation samples of a plurality of autocorrelation samples or a power spectral density of the bistatic communication channel;
      transmit a ranging signal via the one or more ranging devices;
      receive reflected ranging signals based on the ranging signal via the one or more ranging devices to obtain a monostatic ranging channel estimate; and
      transmit a sidelink transmission to the second wireless communication device via the one or more transceivers using at least one of a transmit power or a beamforming parameter selected based on joint communication-ranging side information, wherein the joint communication-ranging side information is based on the bistatic communication channel feedback and the monostatic ranging channel estimate.

2. The apparatus of claim 1, wherein the one or more processors are further configured to:
   obtain a communication channel Doppler profile based on the bistatic communication channel feedback; and
   estimate the monostatic ranging channel estimate based on the reflected ranging signals, wherein the monostatic ranging channel estimate comprises a ranging channel Doppler and angular profile.

3. The apparatus of claim 2, wherein the one or more processors are further configured to:
   associate and correlate the communication channel Doppler profile with the ranging channel Doppler and angular profile to obtain the joint communication-ranging side information.

4. The apparatus of claim 1, wherein the one or more processors are further configured to:
   transmit an additional ranging signal;
   receive additional reflected ranging signals based on the additional ranging signal; and
   obtain a new monostatic ranging channel estimate based on the additional reflected ranging signals and the joint communication-ranging side information.

5. The apparatus of claim 1, wherein the one or more processors are further configured to:
   select a transmit beam comprising the beamforming parameter for the sidelink transmission based on the joint communication-ranging side information.

6. The apparatus of claim 5, wherein the transmit beam comprises a narrow beam width in response to the joint communication-ranging side information indicating a line-of-sight communication link between the first wireless communication device and the second wireless communication device.

7. The apparatus of claim 5, wherein the transmit beam comprises a beam direction directed towards a target for reflection of the sidelink transmission in response to the joint communication-ranging side information indicating a non-line-of-sight communication link between the first wireless communication device and the second wireless communication device.

8. A method for wireless communication at a first wireless communication device configured for wireless communication, the method comprising:
   transmitting a sidelink message to a second wireless communication device via a bistatic communication channel between the first wireless communication device and the second wireless communication device;
   receiving bistatic communication channel feedback from the second wireless communication device, the bistatic communication channel feedback being generated by the second wireless communication device based on the sidelink message, wherein the bistatic communication channel feedback comprises at least one of a set of initial autocorrelation samples of a plurality of autocorrelation samples or a power spectral density of the bistatic communication channel;
   transmitting a ranging signal;
   receiving reflected ranging signals based on the ranging signal to obtain a monostatic ranging channel estimate; and
   transmitting a sidelink transmission to the second wireless communication device using at least one of a transmit power or a beamforming parameter selected based on joint communication-ranging side information, wherein the joint communication-ranging side information is based on the bistatic communication channel feedback and the monostatic ranging channel estimate.

9. The method of claim 8, further comprising:
   obtaining a communication channel Doppler profile based on the bistatic communication channel feedback; and
   estimating the monostatic ranging channel estimate based on the reflected ranging signals, wherein the monostatic ranging channel estimate comprises a ranging channel Doppler and angular profile.

10. The method of claim 9, further comprising:
associating and correlating the communication channel Doppler profile with the ranging channel Doppler and angular profile to obtain the joint communication-ranging side information.

11. The method of claim 8, further comprising:
transmitting an additional ranging signal;
receiving additional reflected ranging signals based on the additional ranging signal; and
obtaining a new monostatic ranging channel estimate based on the additional reflected ranging signals and the joint communication-ranging side information.

12. The method of claim 8, further comprising:
selecting a transmit beam comprising the beamforming parameter for the sidelink transmission based on the joint communication-ranging side information.

13. The method of claim 12, wherein the transmit beam comprises a narrow beam width in response to the joint communication-ranging side information indicating a line-of-sight communication link between the first wireless communication device and the second wireless communication device.

14. The method of claim 12, wherein the transmit beam comprises a beam direction directed towards a target for reflection of the sidelink transmission in response to the joint communication-ranging side information indicating a non-line-of-sight communication link between the first wireless communication device and the second wireless communication device.

15. A first wireless communication device configured for wireless communication, comprising:
means for transmitting a sidelink message to a second wireless communication device via a bistatic communication channel between the first wireless communication device and the second wireless communication device;
means for receiving bistatic communication channel feedback from the second wireless communication device, the bistatic communication channel feedback being generated by the second wireless communication device based on the sidelink message, wherein the bistatic communication channel feedback comprises at least one of a set of initial autocorrelation samples of a plurality of autocorrelation samples or a power spectral density of the bistatic communication channel;
means for transmitting a ranging signal;
means for receiving reflected ranging signals based on the ranging signal to obtain a monostatic ranging channel estimate; and
means for transmitting a sidelink transmission to the second wireless communication device using at least one of a transmit power or a beamforming parameter selected based on joint communication-ranging side information, wherein the joint communication-ranging side information is based on the bistatic communication channel feedback and the monostatic ranging channel estimate.

16. The first wireless communication device of claim 15, further comprising:
means for obtaining a communication channel Doppler profile based on the bistatic communication channel feedback; and
means for estimating the monostatic ranging channel estimate based on the reflected ranging signals, wherein the monostatic ranging channel estimate comprises a ranging channel Doppler and angular profile.

17. The first wireless communication device of claim 16, further comprising:
means for associating and correlating the communication channel Doppler profile with the ranging channel Doppler and angular profile to obtain the joint communication-ranging side information.

18. The first wireless communication device of claim 15, further comprising:
means for transmitting an additional ranging signal;
means for receiving additional reflected ranging signals based on the additional ranging signal; and
means for obtaining a new monostatic ranging channel estimate based on the additional reflected ranging signals and the joint communication-ranging side information.

19. The first wireless communication device of claim 15, further comprising:
means for selecting a transmit beam comprising the beamforming parameter for the sidelink transmission based on the joint communication-ranging side information.

20. The first wireless communication device of claim 19, wherein the transmit beam comprises a narrow beam width in response to the joint communication-ranging side information indicating a line-of-sight communication link between the first wireless communication device and the second wireless communication device.

21. The first wireless communication device of claim 19, wherein the transmit beam comprises a beam direction directed towards a target for reflection of the sidelink transmission in response to the joint communication-ranging side information indicating a non-line-of-sight communication link between the first wireless communication device and the second wireless communication device.

22. A non-transitory computer-readable medium having stored therein instructions executable by one or more processors of a first wireless communication device to:
transmit a sidelink message to a second wireless communication device via a bistatic communication channel between the first wireless communication device and the second wireless communication device;
receive bistatic communication channel feedback from the second wireless communication device, the bistatic communication channel feedback being generated by the second wireless communication device based on the sidelink message, wherein the bistatic communication channel feedback comprises at least one of a set of initial autocorrelation samples of a plurality of autocorrelation samples or a power spectral density of the bistatic communication channel;
transmit a ranging signal;
receive reflected ranging signals based on the ranging signal to obtain a monostatic ranging channel estimate; and
transmit a sidelink transmission to the second wireless communication device using at least one of a transmit power or a beamforming parameter selected based on joint communication-ranging side information, wherein the joint communication-ranging side information is based on the bistatic communication channel feedback and the monostatic ranging channel estimate.

23. The non-transitory computer-readable medium of claim 22, further comprising instructions executable by the one or more processors of the first wireless communication device to:
obtain a communication channel Doppler profile based on the bistatic communication channel feedback;

estimate the monostatic ranging channel estimate based on the reflected ranging signals, wherein the monostatic ranging channel estimate comprises a ranging channel Doppler and angular profile; and associate and correlate the communication channel Doppler profile with the ranging channel Doppler and angular profile to obtain the joint communication-ranging side information.

24. The non-transitory computer-readable medium of claim 22, further comprising instructions executable by the one or more processors of the first wireless communication device to:

select a transmit beam comprising the beamforming parameter for the sidelink transmission based on the joint communication-ranging side information.

* * * * *